(12) United States Patent
Miller et al.

(10) Patent No.: US 11,028,220 B2
(45) Date of Patent: Jun. 8, 2021

(54) RELATING TO STRUCTURAL ADHESIVES

(71) Applicant: Zephyros, Inc., Romeo, MI (US)

(72) Inventors: Ira Miller, Bloomfield Township, MI (US); Michael Czaplicki, Romeo, MI (US)

(73) Assignee: ZEPHYROS, INC., Romeo, MI (US)

( * ) Notice: Subject to any disclaimer, the term of this patent is extended or adjusted under 35 U.S.C. 154(b) by 0 days.

(21) Appl. No.: 15/518,136

(22) PCT Filed: Oct. 7, 2015

(86) PCT No.: PCT/EP2015/073174
§ 371 (c)(1),
(2) Date: Apr. 10, 2017

(87) PCT Pub. No.: WO2016/055535
PCT Pub. Date: Apr. 14, 2016

(65) Prior Publication Data
US 2017/0240774 A1    Aug. 24, 2017

(30) Foreign Application Priority Data

Oct. 10, 2014  (GB) ..................... 1417985

(51) Int. Cl.
*C08G 59/18* (2006.01)
*C09J 5/06* (2006.01)
(Continued)

(52) U.S. Cl.
CPC ....... *C08G 59/186* (2013.01); *C08G 59/4021* (2013.01); *C08L 71/00* (2013.01); *C09D 5/08* (2013.01); *C09J 5/06* (2013.01); *C09J 7/35* (2018.01); *C09J 9/00* (2013.01); *C09J 109/06* (2013.01); *C09J 163/00* (2013.01); *C08G 2650/56* (2013.01); *C09J 2400/163* (2013.01);
(Continued)

(58) Field of Classification Search
CPC ..... C09J 109/06; C09J 7/35; C09J 7/28; C09J 5/06; C09J 9/00; C09J 163/00; C08G 59/186; C08G 59/4021; C08L 71/00; C09D 5/08
USPC ........................................................ 525/523
See application file for complete search history.

(56) References Cited

U.S. PATENT DOCUMENTS

| 3,707,583 A | 12/1972 | McKown |
| 3,860,541 A | 1/1975 | Lehmann et al. |

(Continued)

FOREIGN PATENT DOCUMENTS

| AL | 01/046290 A1 | 6/2001 |
| CA | 2425414 A1 | 4/2002 |

(Continued)

OTHER PUBLICATIONS

International Search Report for application No. PCT/EP2015/073174, dated Apr. 1, 2016.
(Continued)

*Primary Examiner* — David T Karst
(74) *Attorney, Agent, or Firm* — The Dobrusin Law Firm, P.C.

(57) ABSTRACT

The invention relates to structural adhesives and in particular to structural adhesives which are heat activated and which can be used for the bonding of components, particularly metal components, employed in the automotive industry.

19 Claims, 4 Drawing Sheets

(51) Int. Cl.
*C09J 163/00* (2006.01)
*C08G 59/40* (2006.01)
*C09D 5/08* (2006.01)
*C09J 7/35* (2018.01)
*C08L 71/00* (2006.01)
*C09J 9/00* (2006.01)
*C09J 109/06* (2006.01)

(52) U.S. Cl.
CPC ........ *C09J 2461/00* (2013.01); *C09J 2463/00* (2013.01)

(56) References Cited

U.S. PATENT DOCUMENTS

| | | |
|---|---|---|
| 3,944,631 A | 3/1976 | Yu et al. |
| 3,984,497 A | 10/1976 | Owens et al. |
| 3,985,703 A | 10/1976 | Ferry et al. |
| 4,034,013 A | 7/1977 | Lane |
| 4,096,202 A | 6/1978 | Farnham et al. |
| 4,138,462 A | 2/1979 | Procida et al. |
| 4,304,709 A | 12/1981 | Sallee |
| 4,306,040 A | 12/1981 | Baer |
| 4,427,481 A | 1/1984 | Smith et al. |
| 4,495,324 A | 1/1985 | Chacko et al. |
| 4,536,436 A | 8/1985 | Maeoka et al. |
| 4,538,380 A | 9/1985 | Colliander |
| 4,601,769 A | 7/1986 | DeHoff |
| 4,693,775 A | 9/1987 | Harrsion et al. |
| 4,724,243 A | 2/1988 | Harrison et al. |
| 4,749,434 A | 6/1988 | Harrison |
| 4,769,166 A | 9/1988 | Harrison |
| 4,778,845 A | 10/1988 | Tschan et al. |
| 4,833,191 A | 5/1989 | Bushway et al. |
| 4,871,590 A | 10/1989 | Merz et al. |
| 4,898,630 A | 2/1990 | Kitoh et al. |
| 4,908,273 A | 3/1990 | Urech et al. |
| 4,922,596 A | 5/1990 | Wycech |
| 4,923,902 A | 5/1990 | Wycech |
| 4,978,562 A | 12/1990 | Wycech |
| 4,995,545 A | 2/1991 | Wycech |
| 5,074,913 A | 12/1991 | Trivett |
| 5,124,186 A | 6/1992 | Wycech |
| 5,164,472 A | 11/1992 | White et al. |
| 5,266,133 A | 11/1993 | Hanley et al. |
| 5,266,610 A | 11/1993 | Malhotra et al. |
| 5,274,006 A | 12/1993 | Kagoshima et al. |
| 5,275,853 A | 1/1994 | Silvis et al. |
| 5,342,873 A | 8/1994 | Merz et al. |
| 5,344,208 A | 9/1994 | Bien et al. |
| 5,382,606 A | 1/1995 | Butikofer |
| 5,401,814 A | 3/1995 | Schomaker et al. |
| 5,464,924 A | 11/1995 | Silvis et al. |
| 5,470,886 A | 11/1995 | Makhlouf et al. |
| 5,475,039 A | 12/1995 | Butikofer |
| 5,506,025 A | 4/1996 | Otto et al. |
| 5,575,526 A | 11/1996 | Wycech |
| 5,648,401 A | 7/1997 | Czaplicki et al. |
| 5,649,400 A | 7/1997 | Norimichi |
| 5,708,042 A | 1/1998 | Hasegawa |
| 5,712,317 A | 1/1998 | Makhlouf et al. |
| 5,725,272 A | 3/1998 | Jones |
| 5,755,486 A | 5/1998 | Wycech |
| 5,766,719 A | 6/1998 | Rimkus |
| 5,783,272 A | 7/1998 | Wong |
| 5,834,078 A | 11/1998 | Cavitt et al. |
| 5,884,960 A | 3/1999 | Wycech |
| 5,894,071 A | 4/1999 | Merz et al. |
| 5,911,932 A | 6/1999 | Dyksterhouse |
| 5,931,474 A | 8/1999 | Chang et al. |
| 5,932,680 A | 8/1999 | Heider |
| 5,948,508 A | 9/1999 | Pastore et al. |
| 5,962,093 A | 10/1999 | White et al. |
| 5,964,979 A | 10/1999 | George et al. |
| 5,985,435 A | 11/1999 | Czaplicki et al. |
| 5,994,422 A | 11/1999 | Born et al. |
| 5,997,077 A | 12/1999 | Siebels et al. |
| 6,004,425 A | 12/1999 | Born et al. |
| 6,006,484 A | 12/1999 | Geissbuehler |
| 6,030,701 A | 2/2000 | Johnson et al. |
| 6,033,300 A | 3/2000 | Schneider |
| 6,040,350 A | 3/2000 | Fukui |
| 6,057,382 A | 5/2000 | Karim et al. |
| 6,068,922 A | 5/2000 | Vercesi et al. |
| 6,077,884 A | 6/2000 | Hess et al. |
| 6,093,358 A | 7/2000 | Schiewe et al. |
| 6,096,791 A | 8/2000 | Born et al. |
| 6,103,341 A | 8/2000 | Barz et al. |
| 6,103,784 A | 8/2000 | Hilborn et al. |
| 6,111,015 A | 8/2000 | Eldin et al. |
| 6,131,897 A | 10/2000 | Barz et al. |
| 6,133,335 A | 10/2000 | Mahoney et al. |
| 6,135,541 A | 10/2000 | Geise et al. |
| 6,136,398 A | 10/2000 | Willett et al. |
| 6,136,944 A | 10/2000 | Stewart et al. |
| 6,146,565 A | 11/2000 | Keller |
| 6,150,428 A | 11/2000 | Hanley et al. |
| 6,153,302 A | 11/2000 | Karim et al. |
| 6,162,504 A | 12/2000 | Hubert et al. |
| 6,174,932 B1 | 1/2001 | Pachl et al. |
| 6,180,715 B1 | 1/2001 | Schmidt |
| 6,218,442 B1 | 4/2001 | Hilborn et al. |
| 6,228,449 B1 | 5/2001 | Meyer |
| 6,232,433 B1 | 5/2001 | Narayan |
| 6,235,842 B1 | 5/2001 | Kuwano et al. |
| 6,263,635 B1 | 7/2001 | Czaplicki |
| 6,270,600 B1 | 8/2001 | Wycech |
| 6,277,898 B1 | 8/2001 | Pachl et al. |
| 6,281,260 B1 | 8/2001 | Hanley et al. |
| 6,287,669 B1 | 9/2001 | George et al. |
| 6,296,298 B1 | 10/2001 | Barz |
| 6,303,672 B1 | 10/2001 | Papalos et al. |
| 6,311,452 B1 | 11/2001 | Barz et al. |
| 6,312,668 B2 | 11/2001 | Mitra et al. |
| 6,319,964 B1 | 11/2001 | Blank et al. |
| 6,348,513 B1 | 2/2002 | Hilborn et al. |
| 6,350,791 B1 | 2/2002 | Feichtmeier et al. |
| 6,358,584 B1 | 3/2002 | Czaplicki |
| 6,368,438 B1 | 4/2002 | Chang et al. |
| 6,376,564 B1 | 4/2002 | Harrison |
| 6,382,635 B1 | 5/2002 | Fitzgerald |
| 6,383,610 B1 | 5/2002 | Barz et al. |
| 6,403,222 B1 | 6/2002 | Harrison |
| 6,416,611 B1 | 7/2002 | Roberts et al. |
| 6,419,305 B1 | 7/2002 | Larsen |
| 6,429,244 B1 | 8/2002 | Rinka et al. |
| 6,432,475 B1 | 8/2002 | Yamamoto et al. |
| 6,437,055 B1 | 8/2002 | Moriarity et al. |
| 6,440,257 B1 | 8/2002 | Zhou et al. |
| 6,441,075 B2 | 8/2002 | Hirata et al. |
| 6,441,081 B1 | 8/2002 | Sadatoshi et al. |
| H2047 H | 9/2002 | Harrison et al. |
| 6,444,149 B1 | 9/2002 | Valentinsson |
| 6,444,713 B1 | 9/2002 | Pachl et al. |
| 6,448,338 B1 | 9/2002 | Born et al. |
| 6,451,231 B1 | 9/2002 | Harrison et al. |
| 6,451,876 B1 | 9/2002 | Koshy |
| 6,455,146 B1 | 9/2002 | Fitzgerald |
| 6,455,476 B1 | 9/2002 | Imai et al. |
| 6,455,634 B1 | 9/2002 | Khandpur et al. |
| 6,467,834 B1 | 10/2002 | Barz et al. |
| 6,471,285 B1 | 10/2002 | Czaplicki et al. |
| 6,479,560 B2 | 11/2002 | Freitag et al. |
| 6,482,486 B1 | 11/2002 | Czaplicki et al. |
| 6,486,256 B1 | 11/2002 | Tarbutton et al. |
| 6,489,400 B2 | 12/2002 | Khandpur et al. |
| 6,506,494 B2 | 1/2003 | Brandys et al. |
| 6,546,693 B2 | 4/2003 | Wycech |
| 6,548,593 B2 | 4/2003 | Merz et al. |
| 6,561,571 B1 | 5/2003 | Brennecke |
| 6,573,309 B1 | 6/2003 | Reitenbach et al. |
| 6,586,089 B2 | 7/2003 | Golden |
| 6,589,621 B1 | 7/2003 | Beckerdite et al. |
| 6,593,380 B2 | 7/2003 | Gehlsen et al. |
| 6,607,831 B2 | 8/2003 | Ho et al. |

(56) References Cited

U.S. PATENT DOCUMENTS

| | | | |
|---|---|---|---|
| 6,617,366 B2 | 9/2003 | Sueda et al. |
| 6,620,501 B1 | 9/2003 | Kassa et al. |
| 6,634,698 B2 | 10/2003 | Kleino |
| 6,668,457 B1 | 12/2003 | Czaplicki |
| 6,682,818 B2 | 1/2004 | Czaplicki et al. |
| 6,692,347 B1 | 2/2004 | Schneider |
| 6,706,772 B2 | 3/2004 | Czaplicki et al. |
| 6,706,802 B2 | 3/2004 | Carlson et al. |
| 6,722,720 B2 | 4/2004 | Donick et al. |
| 6,730,713 B2 | 5/2004 | Czaplicki |
| 6,740,067 B2 | 5/2004 | Leise et al. |
| 6,740,379 B1 | 5/2004 | Congard et al. |
| 6,740,399 B1 | 5/2004 | George et al. |
| 6,753,379 B1 | 6/2004 | Kawate et al. |
| 6,774,171 B2 | 8/2004 | Kassa et al. |
| 6,776,869 B1 | 8/2004 | Schenkel |
| 6,777,079 B2 | 8/2004 | Zhou et al. |
| 6,787,065 B1 | 9/2004 | Schapira et al. |
| 6,787,579 B2 | 9/2004 | Czaplicki et al. |
| 6,787,593 B2 | 9/2004 | Bell et al. |
| 6,787,605 B2 | 9/2004 | Clough et al. |
| 6,787,606 B1 | 9/2004 | Chen |
| 6,790,597 B2 | 9/2004 | Dershem et al. |
| 6,790,906 B2 | 9/2004 | Chaignon et al. |
| 6,797,371 B1 | 9/2004 | Gehlsen et al. |
| 6,800,157 B2 | 10/2004 | Tarbutton et al. |
| 6,800,680 B2 | 10/2004 | Stark et al. |
| 6,805,768 B2 | 10/2004 | Agarwal et al. |
| 6,806,320 B2 | 10/2004 | Everaerts et al. |
| 6,811,864 B2 | 11/2004 | Czaplicki et al. |
| 6,820,923 B1 | 11/2004 | Bock |
| 6,824,451 B2 | 11/2004 | Hollatz et al. |
| 6,838,509 B2 | 1/2005 | Shimo et al. |
| 6,846,559 B2 | 1/2005 | Czalicki et al. |
| 6,884,854 B2 | 4/2005 | Schoenfeld et al. |
| 6,887,914 B2 | 5/2005 | Czalicki et al. |
| 6,890,964 B2 | 5/2005 | Czaplicki et al. |
| 6,894,082 B2 | 5/2005 | Brantl et al. |
| 6,911,109 B2 | 6/2005 | Giroux et al. |
| 6,920,693 B2 | 7/2005 | Hankins et al. |
| 6,955,593 B2 | 10/2005 | Lewis et al. |
| 6,991,237 B2 | 1/2006 | Kassa et al. |
| 7,008,680 B2 | 3/2006 | Everaerts et al. |
| 7,071,263 B2 | 7/2006 | Cheng et al. |
| 7,084,209 B2 | 8/2006 | Everaerts et al. |
| 7,084,210 B2 | 8/2006 | Eagle |
| 7,094,843 B2 | 8/2006 | Meyer |
| 7,119,149 B2 | 10/2006 | Ferguson et al. |
| 7,125,461 B2 | 10/2006 | Czaplicki et al. |
| 7,169,467 B2 | 1/2007 | Wilson |
| 7,199,165 B2 | 4/2007 | Kassa et al. |
| 7,297,740 B2 | 11/2007 | Dyksterhouse |
| 7,392,929 B1 | 7/2008 | Finerman et al. |
| 7,438,782 B2 | 10/2008 | Sheasley et al. |
| 7,467,452 B2 | 12/2008 | Lande et al. |
| 7,494,179 B2 | 2/2009 | Deachin |
| 7,503,620 B2 | 3/2009 | Brennecke et al. |
| 7,892,396 B2 | 2/2011 | Sheasley |
| 7,926,179 B2 | 4/2011 | Gray et al. |
| 2002/0013389 A1 | 1/2002 | Taylor et al. |
| 2002/0115737 A1 | 8/2002 | Freitag et al. |
| 2002/0123575 A1 | 9/2002 | Kato et al. |
| 2002/0164450 A1 | 11/2002 | Lupini et al. |
| 2002/0182955 A1 | 12/2002 | Weglewski et al. |
| 2002/0192387 A1 | 12/2002 | Agarwal et al. |
| 2003/0045620 A1 | 3/2003 | Carlson et al. |
| 2003/0050352 A1 | 3/2003 | Guenther et al. |
| 2003/0144416 A1 | 7/2003 | Tarbutton et al. |
| 2003/0159773 A1 | 8/2003 | Tomiyama et al. |
| 2003/0183317 A1 | 10/2003 | Czaplicki et al. |
| 2003/0186049 A1 | 10/2003 | Czaplicki et al. |
| 2003/0195268 A1 | 10/2003 | Freitag et al. |
| 2004/0048078 A1 | 3/2004 | Czaplicki et al. |
| 2004/0058181 A1 | 3/2004 | Garnault et al. |
| 2004/0079478 A1 | 4/2004 | Merz |
| 2004/0180193 A1 | 9/2004 | Oda et al. |
| 2004/0181013 A1 | 9/2004 | Schenkel |
| 2004/0197545 A1 | 10/2004 | Gehlsen et al. |
| 2004/0204551 A1 | 10/2004 | Czaplicki et al. |
| 2004/0229000 A1 | 11/2004 | Khandpur et al. |
| 2004/0266898 A1 | 12/2004 | Kassa et al. |
| 2005/0016677 A1 | 1/2005 | Carlson et al. |
| 2005/0020703 A1 | 1/2005 | Czaplicki et al. |
| 2005/0022929 A1 | 2/2005 | Schoenfeld et al. |
| 2005/0081383 A1 | 4/2005 | Kosal et al. |
| 2005/0103422 A1 | 5/2005 | Kawaguchi |
| 2005/0119372 A1 | 6/2005 | Czaplicki et al. |
| 2005/0154089 A1 | 7/2005 | Taylor et al. |
| 2005/0159511 A1 | 7/2005 | Kramer |
| 2005/0159531 A1 | 7/2005 | Ferng et al. |
| 2005/0172486 A1 | 8/2005 | Carlson et al. |
| 2005/0221046 A1 | 10/2005 | Finerman et al. |
| 2005/0230027 A1 | 10/2005 | Kassa et al. |
| 2005/0241756 A1 | 11/2005 | Harthcock et al. |
| 2005/0279567 A1 | 12/2005 | Ito |
| 2006/0021697 A1 | 2/2006 | Riley |
| 2006/0057333 A1 | 3/2006 | Brahim |
| 2006/0090343 A1 | 5/2006 | Riley et al. |
| 2006/0155045 A1 | 7/2006 | Tsuno et al. |
| 2006/0171269 A1 | 8/2006 | Hiramatsu |
| 2006/0188726 A1 | 8/2006 | Muenz et al. |
| 2006/0252860 A1 | 11/2006 | Ui et al. |
| 2007/0045042 A1 | 3/2007 | Barz et al. |
| 2007/0087848 A1 | 4/2007 | Larsen et al. |
| 2007/0088138 A1 | 4/2007 | Czaplicki et al. |
| 2007/0090560 A1 | 4/2007 | Kassa et al. |
| 2007/0095475 A1 | 5/2007 | Hable |
| 2007/0101679 A1 | 5/2007 | Harthcock et al. |
| 2007/0116961 A1 | 5/2007 | Connell et al. |
| 2007/0117874 A1 | 5/2007 | Kassa et al. |
| 2007/0122510 A1 | 5/2007 | Mendiboure |
| 2007/0134058 A1 | 6/2007 | Meyer et al. |
| 2007/0138683 A1 | 6/2007 | Hideki et al. |
| 2007/0264438 A1 | 11/2007 | Kawai |
| 2007/0282081 A1 | 12/2007 | Ichiroku |
| 2007/0284036 A1 | 12/2007 | Sheasley |
| 2008/0029200 A1 | 2/2008 | Sheasley |
| 2008/0060742 A1 | 3/2008 | Sheasley et al. |
| 2008/0241576 A1 | 10/2008 | Le Gall et al. |
| 2008/0305362 A1 | 12/2008 | Schroeder et al. |
| 2008/0308212 A1 | 12/2008 | Sheasley et al. |
| 2008/0311405 A1 | 12/2008 | Wang et al. |
| 2009/0269547 A1 | 10/2009 | Meyer et al. |
| 2010/0025147 A1 | 2/2010 | Kassa |
| 2010/0272908 A1 | 10/2010 | Sturgill |
| 2011/0098382 A1 | 4/2011 | Czaplicki |
| 2011/0105637 A1 | 5/2011 | Fujita et al. |
| 2012/0186721 A1 | 7/2012 | Preghenella |
| 2012/0277341 A1* | 11/2012 | Smith ............... C08F 2/48 522/64 |
| 2013/0206333 A1* | 8/2013 | Czaplicki ............ C09J 5/06 156/275.5 |
| 2013/0284518 A1* | 10/2013 | Wu ................. C09K 8/035 175/65 |
| 2015/0050075 A1 | 2/2015 | Kelley et al. |

FOREIGN PATENT DOCUMENTS

| | | |
|---|---|---|
| CN | 102105547 A | 6/2011 |
| DE | 3838655 A1 | 5/1990 |
| DE | 19919783 A1 | 11/2000 |
| EP | 0360214 A2 | 3/1990 |
| EP | 0383498 A2 | 8/1990 |
| EP | 0442178 A1 | 8/1991 |
| EP | 0710696 A2 | 5/1996 |
| EP | 0730999 A1 | 9/1996 |
| EP | 0819723 A1 | 1/1998 |
| EP | 0893332 A1 | 1/1999 |
| EP | 1022320 A1 | 7/2000 |
| EP | 1055699 A1 | 11/2000 |
| EP | 1072647 A2 | 1/2001 |
| EP | 1123348 A2 | 8/2001 |
| EP | 1031496 B1 | 12/2001 |
| EP | 1182087 A2 | 2/2002 |

(56) References Cited

FOREIGN PATENT DOCUMENTS

| | | |
|---|---|---|
| EP | 1331080 A2 | 7/2003 |
| EP | 0703931 B1 | 10/2003 |
| EP | 1362683 A2 | 11/2003 |
| EP | 1240266 B1 | 2/2004 |
| EP | 0851894 B1 | 4/2004 |
| EP | 1272587 B1 | 5/2004 |
| EP | 1155084 B1 | 6/2004 |
| EP | 1431325 A1 | 6/2004 |
| EP | 1075498 B1 | 7/2004 |
| EP | 0820491 B1 | 8/2004 |
| EP | 0947529 B1 | 8/2004 |
| EP | 1185595 A2 | 8/2004 |
| EP | 1252217 B1 | 8/2004 |
| EP | 1449868 A1 | 8/2004 |
| EP | 1023413 B1 | 9/2004 |
| EP | 1155082 B1 | 9/2004 |
| EP | 1305376 B1 | 9/2004 |
| EP | 1155053 B1 | 10/2004 |
| EP | 1163308 B1 | 10/2004 |
| EP | 1471105 A2 | 10/2004 |
| EP | 1001893 B1 | 11/2004 |
| EP | 1115770 B1 | 11/2004 |
| EP | 1187888 B1 | 11/2004 |
| EP | 1591224 A1 | 2/2005 |
| EP | 1574537 A1 | 9/2005 |
| EP | 1602702 A1 | 12/2005 |
| EP | 1458594 B1 | 3/2006 |
| EP | 1666228 A2 | 6/2006 |
| EP | 1506265 B1 | 7/2006 |
| EP | 1578838 B1 | 8/2006 |
| EP | 1609831 B1 | 8/2006 |
| EP | 1453925 B1 | 10/2006 |
| EP | 2268752 B1 | 9/2016 |
| GB | 903146 A | 8/1962 |
| JP | S52-5056 B1 | 1/1977 |
| JP | 56-004432 A | 1/1981 |
| JP | 57-117542 A | 7/1982 |
| JP | 60-096681 A | 5/1985 |
| JP | 62-062882 A | 3/1987 |
| JP | 04-059819 A | 2/1992 |
| JP | 09-176616 A | 7/1997 |
| JP | 09-249730 A | 9/1997 |
| JP | 09-316169 A | 12/1997 |
| JP | 10-045031 A | 2/1998 |
| JP | 11-106544 A | 4/1999 |
| JP | 2001-62833 A | 3/2001 |
| JP | 2001191949 A | 7/2001 |
| JP | 2002-362412 A | 12/2002 |
| JP | 2004315688 A | 11/2004 |
| JP | 05-065391 A | 3/2005 |
| JP | 2005187508 A | 7/2005 |
| JP | 06-166852 A | 6/2006 |
| JP | 2011/137092 A | 7/2011 |
| JP | 2006-520848 | 9/2014 |
| WO | 94/29358 A1 | 12/1994 |
| WO | 95/033785 A1 | 12/1995 |
| WO | 96/32453 A1 | 10/1996 |
| WO | 97/002967 A1 | 1/1997 |
| WO | 97/11122 A1 | 3/1997 |
| WO | 97/012929 A1 | 4/1997 |
| WO | 97/019124 A1 | 5/1997 |
| WO | 98/036944 A1 | 8/1998 |
| WO | 98/052997 A1 | 11/1998 |
| WO | 98/053008 A1 | 11/1998 |
| WO | 99/002578 A1 | 1/1999 |
| WO | 99/008901 A1 | 2/1999 |
| WO | 99/016840 A1 | 4/1999 |
| WO | 990/57197 A1 | 11/1999 |
| WO | 00/003894 A1 | 1/2000 |
| WO | 00/005288 A1 | 2/2000 |
| WO | 00/012571 A1 | 3/2000 |
| WO | 00/012595 A1 | 3/2000 |
| WO | 00/013876 A1 | 3/2000 |
| WO | 00/020483 A2 | 4/2000 |
| WO | 00/027920 A1 | 5/2000 |
| WO | 00/037242 A1 | 6/2000 |
| WO | 00/037554 A1 | 6/2000 |
| WO | 00/039232 A1 | 7/2000 |
| WO | 00/040629 A1 | 7/2000 |
| WO | 00/052086 A2 | 9/2000 |
| WO | 00/056830 A1 | 9/2000 |
| WO | 00/071632 A1 | 11/2000 |
| WO | 01/019667 A1 | 3/2001 |
| WO | 01/029142 A1 | 4/2001 |
| WO | 010/49797 A1 | 7/2001 |
| WO | 01/057130 A1 | 8/2001 |
| WO | 01/071225 A1 | 9/2001 |
| WO | 01/088033 A1 | 11/2001 |
| WO | 01/094492 A1 | 12/2001 |
| WO | 02/012409 A1 | 2/2002 |
| WO | 02/070619 A1 | 9/2002 |
| WO | 02/070620 A1 | 9/2002 |
| WO | 02/088214 A1 | 11/2002 |
| WO | 2003/011954 A1 | 2/2003 |
| WO | 2003/040251 A1 | 5/2003 |
| WO | 2003/051676 A1 | 6/2003 |
| WO | 2003/054069 A1 | 7/2003 |
| WO | 2003/058340 A1 | 7/2003 |
| WO | 2003/059997 A1 | 7/2003 |
| WO | 2003/072677 A1 | 9/2003 |
| WO | 2003/078163 A1 | 9/2003 |
| WO | 2003/095575 A2 | 11/2003 |
| WO | 2004/050740 A1 | 6/2004 |
| WO | 2004/055092 A1 | 7/2004 |
| WO | 2004/060956 A1 | 7/2004 |
| WO | 2004/060984 A1 | 7/2004 |
| WO | 2004/062869 A2 | 7/2004 |
| WO | 2004/065485 A1 | 8/2004 |
| WO | 2004/076507 A2 | 9/2004 |
| WO | 2004/078853 A2 | 9/2004 |
| WO | 2004/085510 A1 | 10/2004 |
| WO | 2004/085564 A1 | 10/2004 |
| WO | 2004/099312 A1 | 11/2004 |
| WO | 2005/002950 A2 | 1/2005 |
| WO | 2005/007720 A1 | 1/2005 |
| WO | 2005/044630 A1 | 5/2005 |
| WO | 2005/047393 A1 | 5/2005 |
| WO | 2005/090431 A1 | 9/2005 |
| WO | 2005/090455 A1 | 9/2005 |
| WO | 2005/095484 A1 | 10/2005 |
| WO | 2005/105405 A1 | 11/2005 |
| WO | 2005/108456 A1 | 11/2005 |
| WO | 2005/113627 A1 | 12/2005 |
| WO | 2006/074394 A2 | 7/2006 |
| WO | 2006/128722 A1 | 12/2006 |
| WO | 2006/131190 A1 | 12/2006 |
| WO | 2007/025007 A1 | 3/2007 |
| WO | 2007/050658 A1 | 5/2007 |
| WO | 2008/014053 A2 | 1/2008 |
| WO | 2008/157129 A1 | 12/2008 |
| WO | 2009/124709 A1 | 10/2009 |
| WO | 2011/012997 A2 | 2/2011 |
| WO | 2011/109699 A1 | 9/2011 |
| WO | WO-2012110230 A1 * | 8/2012 ............ C09J 113/00 |
| WO | 2013/068819 A2 | 5/2013 |

OTHER PUBLICATIONS

Communication of a Notice of Opposition, EP Application No. 90729501.8 (Patent No. EP2268752) dated Jun. 7, 2017.

Reply to Notice of Opposition dated Nov. 21, 2017, EP Application No. 90729501.8 (Patent No. EP2268752).

Decision Rejecting the Opposition, EP Application No. 90729501.8 (Patent No. EP2268752) dated Dec. 4, 2018.

Potentially Related U.S. Appl. No. 12/936,777, filed Dec. 3, 2010, published as US 2011/0098382 on Apr. 29, 2011.

International Preliminary Report on Patentability dated Oct. 12, 2010; for Corresponding PCT Application No. PCT/EP2009/002546 filed Apr. 7, 2009.

International Search Report dated Jul. 14, 2009; for Corresponding PCT Application No. PCT/EP2009/002546 filed Apr. 7, 2009.

Corresponding PCT Application No. PCT/EP2009/002546 filed Apr. 7, 2009; Published as WO 2009/124709 A1 on Oct. 15, 2009.

(56) References Cited

OTHER PUBLICATIONS

Search Report dated Oct. 15, 2008; for Corresponding Application No. GB0806434.7 filed Apr. 9, 2008.
Corresponding No. GB0806434.7 filed Apr. 9, 2008; Published as WO 2009/124709 A1 on Oct. 15, 2009.
*The Epoxy Book* Published by System Three Resins, Inc. Seattle, Washington (2000).
"Epoxy Resins" Second Edition Encyclopedia of Polymer Science and Engineering, vol. 6, pp. 322-382 (1985).
Born et al. "Structural Bonding in Automotive Applications" (Apr. 2004).
Dvorko. "One-Part Epoxy Compounds and Derived Foam Plastics", published Apr. 13, 2004.
Zalobsky et al., "Recommendations on Selection and Use of Cavity Reinforcement Materials" Proceedings of the 1999 Noise and Vibration Conference.
Weber et al., "Characterizing the in Vehicle Performance of Expandable Sealants Used as Acoustic Baffles", Proceedings of the 1999 Noise and Vibrations Conference.
Weber et al., "Requirements for Improved Performance of Specialty Sealing and Bonding Materials for Automotive Applications", SAE 2000 World Congress, Mar. 6-9, 2000.
Liu et al., "Validation of Epoxy Foam for Structural and Crash Application". 2004 SAE World Congress, Mar. 8-11, 2004.
Schulenburg et al., "Structural Adhesives—Improvements in Vehicle Crash Performance", 2004 SAE World Congress, Mar. 8-11, 2004.
Casey et al., "Expandable Epoxy Foam: A Systematic Approach to Improve Vehicle Performance", 2004 SAE World Congress, Mar. 8-11, 2004.
Lilley et al., Vehicle Acoustic Solutions. (May 5-8, 2003).
Related U.S. Appl. No. 11/188,679, filed Jul. 25, 2005; Issued as U.S. Pat. No. 7,392,929 on Jul. 1, 2008.
Related U.S. Appl. No. 11/189,190, filed Jul. 26, 2005; Published as US 2006/0021697 A1 on Feb. 2, 2006.
Related U.S. Appl. No. 11/254,129, filed Oct. 19, 2005; Published as US 2006/0090343 A1 on May 4, 2006.
Related U.S. Appl. No. 11/339,431, filed Jan. 25, 2006; Issued as U.S. Pat. No. 7,467,452 on Dec. 23, 2008.
Related U.S. Appl. No. 11/390,658, filed Mar. 28, 2006; Issued as U.S. Pat. No. 7,494,179 on Feb. 24, 2009.
Related U.S. Appl. No. 11/391,884, filed Mar. 29, 2006; Published as US 2007-0122510 A1 on May 31, 2007.
Related U.S. Appl. No. 11/339,535, filed Mar. 30, 2006; Published as US 2006-0171269 A1 on Aug. 3, 2006.
Related U.S. Appl. No. 11/393,431, filed Mar. 30, 2006; Published as US 2007-0134058 A1 on Jun. 14, 2007.
Related U.S. Appl. No. 11/401,207, filed Apr. 10, 2006; Published as US 2007-0087848 A1 on Apr. 19, 2007.
Related U.S. Appl. No. 11/381,769, filed May 5, 2006; Issued as U.S. Pat. No. 7,503,620 on Mar. 17, 2009.
Related U.S. Appl. No. 11/422,705, filed Jun. 7, 2006; Issued as U.S. Pat. No. 7,438,782 on Oct. 21, 2008.
Related U.S. Appl. No. 10/597,610, filed Aug. 1, 2006; Published as US 2008-0241576 A1 on Oct. 2, 2008.
Related U.S. Appl. No. 11/461,557, filed Aug. 1, 2006; Issued as U.S. Pat. No. 7,926,179 on Apr. 19, 2011.
Related U.S. Appl. No. 11/467,185, filed Aug. 10, 2006; Published as US 2007-0045042 A1 on Mar. 1, 2007.
Related U.S. Appl. No. 10/867,835, filed Jun. 15, 2004; Issued as U.S. Pat. No. 7,199,165 on Apr. 3, 2007.
Related Patent Application No. PCT/US04/20112, filed Jun. 23, 2004; Published as WO 2005/002950 on Jan. 13, 2005.
Related Patent Application No. US 2011/027166 filed Mar. 4, 2011; Published as WO 2011/109699 on Sep. 9, 2011.
Related U.S. Appl. No. 13/387,192, filed Apr. 4, 2012; Published as US 2012-0186721 A1 on Jul. 26, 2012.
Related U.S. Appl. No. 11/551,035, filed Oct. 19, 2006; Published as US 2007-0090560 A1 on Apr. 26, 2007.
European Office Action dated Oct. 4, 2012 (Appl. No. 09729501.8).
European Office Action dated Sep. 24, 2014 (Appl. No. 09729501.8).
Japanese Office Action dated Jul. 23, 2014; Application No. 2011-503370.
Korean Office Action dated Aug. 20, 2015; Application No. 10-2010-7025154.
Chinese First Search, dated Nov. 18, 2019, Application No. 201580066881.X.

\* cited by examiner

RELATING TO STRUCTURAL ADHESIVES

CLAIM OF PRIORITY

This application claims priority to GB 1417985.7, filed on Oct. 10, 2014.

FIELD

The present invention relates to structural adhesives and in particular to structural adhesives which are heat activated and which can be used for the bonding of components, particularly metal components, employed in the automotive industry.

BACKGROUND

Activatable structural adhesives are known from, for example WO 2009/124709. The adhesives are typically pastes or liquids to enable then to be dispensed between two items to be bonded such as metal panels that are to be joined together. Frequently the adhesive comprises two components which react upon mixing and are therefore supplied as two separate materials for mixing in the location where bond formation is required. The structural adhesive may be employed in automobile reinforcement for example in cavity reinforcement. Alternatively it may be employed to bond together surfaces such as metal and plastic surfaces in a multitude of industries.

Structural adhesives that are pastes or liquids require special handling and storage to prevent or inhibit pre-reaction of the adhesive. Furthermore, they can suffer from the disadvantage that they will flow after application making it difficult to localize a bond and also requiring the use of material in addition to that required for creating the bond. In addition it has hitherto not been possible to provide such an adhesive that can be shaped in its uncured state and which can be cured to provide a bond of the high strengths required of structural adhesives.

There are however applications, where it would be beneficial to have a structural adhesive that is dry and is sufficiently flexible that it can be molded at temperatures below that at which it cures so that it has a definable shape prior to curing. In particular it would be useful to have a structural adhesive that can be provided as a tape or strip and the tape or strip can be configured to a required shape between surfaces to be bonded and then cured to bond the surfaces. It would also be useful if the tape could be stored and supplied in a reel.

Foamable structural adhesives that can be shaped in their unformed state by extrusion or injection molding are known such as the materials that are used for bonding of structural reinforcement in cavities in automobile structures such as pillars and rails. There is, however, a need to improve the processability of such materials in the uncured state and in addition it is desirable to increase the strength of the bond formed particularly by a foamed material and particularly at low degrees of expansion such as below 100% which are desirable to secure components with the fine tolerances required to ensure homogenous strength in a bond between the components.

Structural adhesives are typically curable materials which can be transformed to a hardened adhesive material by heating to within a certain temperature range for a certain period of time.

The temperature to be employed and the time that can be allocated for curing a structural adhesive can depend upon the application in which the adhesive is to be employed. For example the temperature and time may be different when employing the adhesive for bonding in automobile applications and in aerospace applications. The curing conditions that are to be employed will influence the composition and reactivity of the adhesive. In order for an adhesive to have the desired flexibility during blending and prior to curing and the desired reactivity during bond formation it is important that pre-reaction of the adhesive in the time between blending, and processing and application and curing is minimized.

It is known that structural adhesives may be applied to a substrate and subsequently cured by heating. It is also known that the adhesives can be applied to the substrate which is subsequently passed through an anticorrosion bath where an anticorrosion coating is deposited on the substrate which is subsequently baked to dry and harden the coating. The structural adhesive can be formulated so that it is cured at the temperatures experienced in the baking operation. The adhesive can be applied as a paste typically by pumping the adhesive onto the desired location on the substrate. This however suffers from the disadvantage that some of the adhesive may be washed off as the substrate carrying the adhesive paste passes through the bath of the anticorrosion coating. The use of a paste also suffers from the disadvantage that the uncured adhesive on the substrate is somewhat fluid and tacky and can accumulate dust or dirt. Furthermore it can be squeezed out of position when two substrates to be joined are pressed together. This can also lead to fractures within the adhesive after curing providing sites for potential corrosion of the metal which it is used to bond.

US 2008/0305362 discloses two panels of different materials that may be bonded with a structural adhesive composition comprising microcapsules containing corrosion inhibiting materials for protecting the panels from corrosion. For example, a steel vehicle door outer panel may be bonded to an aluminum alloy or magnesium alloy inner panel using an epoxy adhesive. Dispersed within the uncured adhesive are an abundance of microcapsules filled with a fluid or mobile material for reacting with the iron and/or aluminum or magnesium to inhibit corrosion arising from the facing surfaces of the mixed metal panels. The protective material is released from the microcapsules for diffusion through the cured or uncured interfacial adhesive to react with one or both panel surfaces and form a protective coating on the surfaces.

US 2015/0050075 discloses a method for providing a corrosion-resistant barrier between bolted dissimilar metals comprising the steps of disposing epoxy adhesive tape on at least one of a first and second metal member, curing the epoxy adhesive tape, applying a corrosion-resistant layer to the first and second metal members, and bolting the first and second metal members together such that the cured epoxy adhesive tape is positioned between the first and second metal members.

It has also been proposed that the adhesive may be a solid that is dry to the touch at room temperature. Such an adhesive is described in PCT publication WO 2013/068819. These adhesives may be applied to a substrate in the molten state such that they will adhere to the substrate but not cure into their final cured state to provide the structural adhesive. The adhesive may then be reheated to its curing temperature when bonding is required. Unlike the pumpable adhesive these adhesives have a viscosity/temperature profile in which their structure is reversible up to a certain temperature and is irreversible above a certain temperature when curing of the adhesive occurs.

SUMMARY

We have now found that the use of an adhesive of this type for the structural bonding together of substrates particularly when at least one substrate is metal enables a continuous strips of adhesive to be applied which, when cured, has a greatly reduced if any points of fracture within the adhesive strip and which, accordingly, has a greatly reduced potential for allowing the formation of corrosion over time along the area of the surface of the substrate to which the adhesive has been applied.

Accordingly the present invention provides the use of an adhesive for providing corrosion resistance to a substrate to which the adhesive is adhered, wherein the adhesive is reformable in the temperature range of from about 60° C. to about 120° C., and wherein the adhesive is curable in the temperature range of from about 130° C. to about 230° C.; and wherein in the temperature range $G^I > G^{II}$ the storage modulus $G^I$ of the adhesive is higher than the loss modulus of the adhesive, wherein the temperature range $G^I > G^{II}$ is not narrower than of from about 10° C. to about 30° C.; and in the temperature range $G^{II} > G^I$ the loss modulus of the adhesive is higher than the storage modulus $G^I$ of the adhesive, wherein the temperature range $G^{II} > G^I$ is not narrower than of from about 110° C. to about 120° C.

It has been surprisingly found that the adhesive according to the invention, which is characterized by specific rheological properties at specific temperatures, may be advantageously used to prevent corrosion of substrates that are otherwise susceptible to corrosion.

DETAILED DESCRIPTION

Figure 1:
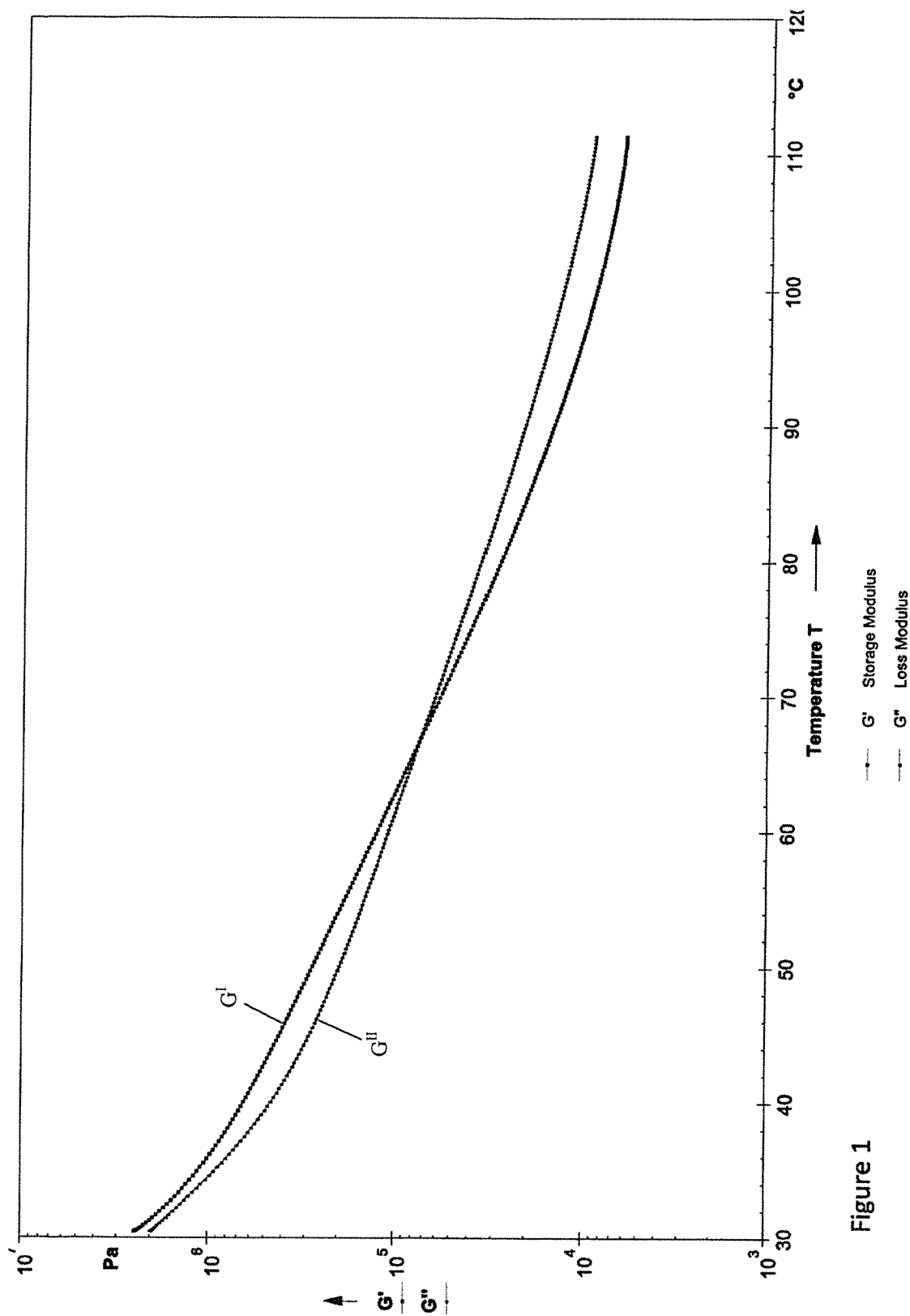
FIG. 1 illustrates a graph of the storage modulus and loss modulus over a range of temperatures for an example material consistent with the teachings herewith.

Without wishing to be bound to any scientific theory, it appears that the use of the specific adhesive according to the invention provides a continuous protective layer of substrates, preferably on metal surfaces, thereby avoiding a direct contact of the substrates with other metal surfaces that are applied to the other side of the adhesive along the bond line. Thus, when adhering two substrates to one another, the adhesive is capable of forming a continuous insulation layer in between. The adhesive according to the invention, due to its specific properties, is capable of creeping into cavities and covering surfaces of various shapes under the conditions of application such that after activation, i.e. heat treatment, the adhesive cures and develops its full adhesive properties thereby providing corrosion resistance to the substrate to which it is applied, and to the substrates it adheres to one another, respectively.

Preferably, the adhesive is used for forming bonds on a substrate that are not susceptible to cause corrosion on the substrate along the length of the bond. Preferably, the substrate comprises a metal or an alloy that is susceptible to corrosion. Preferably, the adhesive is used in a manner such that a continuous band or strip of the adhesive is applied to the substrate.

Preferably, the adhesive according to the invention does not contain corrosion inhibitors.

For the purpose of the specification, "not narrower than" means that at least throughout the specified temperature range the adhesive has the specified properties. Thus, this definition also includes embodiments, where at certain temperatures outside the specified temperature range, the adhesive may have, but does not need to have, the specified properties as well.

Preferably, the temperature range $G^I > G^{II}$ is not narrower than of from about 10° C. to about 35° C., more preferably not narrower than of from about 10° C. to about 40° C., still more preferably not narrower than of from about 10° C. to about 45° C., and most preferably not narrower than of from about 10° C. about 50° C.

Preferably, at least at one temperature within the temperature range $G^I > G^{II}$, the relative difference $G^I - G^{II}$ of the storage modulus $G^I$ of the adhesive and the loss modulus $G^{II}$ of the adhesive is at least about 10,000 Pa, more preferably at least about 20,000 Pa, still more preferably at least about 30,000 Pa. In this regard, the adhesive does not need to fulfill this criterion at any temperature throughout the specified temperature range. On the contrary, it is sufficient when within the specified temperature range there is at least one temperature at which the criterion is fulfilled, not excluding that this may be the case for more than one temperature and/or additionally for temperatures outside the specified temperature range.

Preferably, the temperature range $G^{II} > G^I$ is not narrower than of from about 105° C. to about 120° C., more preferably not narrower than of from about 100° C. to about 120° C.; still more preferably not narrower than of from about 95° C. to about 120° C.; yet more preferably not narrower than of from about 90° C. to about 120° C.; even more preferably not narrower than of from about 85° C. to about 120° C.; and most preferably not narrower than of from about 80° C. to about 120° C.

Preferably, at least at one temperature within the temperature range $G^{II} > G^I$, the relative difference $G^{II} - G^I$ of the loss modulus $G^{II}$ of the adhesive and the storage modulus $G^I$ of the adhesive is at least about 3000 Pa, more preferably at least 4000 Pa, still more preferably at least about 5000 Pa, and in particular at least about 6000 Pa. In this regard, the adhesive does not need to fulfill this criterion at any temperature throughout the specified temperature range. On the contrary, it is sufficient when within the specified temperature range there is at least one temperature at which the criterion is fulfilled, not excluding that this may be the case for more than one temperature and/or additionally for temperatures outside the specified temperature range.

Preferably, the storage modulus $G^I$ of the adhesive is equal to the loss modulus $G^{II}$ of the adhesive at a crossover temperature which is within the temperature range of from about 30° C. to about 110° C.; more preferably about 35° C. to about 105° C., still more preferably about 35° C. to about 100° C.; yet more preferably about 40° C. to about 95° C.; even more preferably about 40° C. to about 90° C.; most preferably about 45° C. to about 85° C.; and in particular about 50° C. to about 80° C.

Preferably, the adhesive starts to cure at about 125° C., more preferably at about 130° C., leading to a thermoset structural adhesive.

Preferably, the invention provides the use of an adhesive for forming bonds on a substrate that are not susceptible to cause corrosion on the substrate along the length of the bond wherein the adhesive is i) heat activated at a temperature in the range about 130° C. to about 230° C.,
ii) reformable in the temperature range about 60° C. to about 120° C. and is curable in the temperature range about 130° C. to about 230° C.; and has
   a) a storage modulus $G^I$ higher than its loss modulus $G^{II}$ for temperatures up to about 50° C.;
   b) a loss modulus $G^{II}$ higher than its storage modulus $G^I$ in the temperature range about 60° C. to about 120° C.; and
   c) starts to cure at about 130° C., leading to a thermoset structural adhesive.

The structural adhesive of the present invention may be applied to various articles of manufacture for adding structural integrity to portions or members of articles or for sealing the articles. Examples of such articles of manufacture include, without limitation, household or industrial appliances, furniture, storage containers, buildings, structures or the like. In preferred embodiments, the structural adhesive of this invention is used for bonding portions of an automotive vehicle or aircraft such as body or frame members (e.g., a vehicle frame rail) of the automotive vehicle.

The present invention provides a structural adhesive composition and its use that has the following preferred properties:

i. it is non-tacky to the touch at ambient temperature; and/or
ii. it is a flexible solid at a temperature in the range from ambient to about 50° C.; and/or
iii. it is a high viscosity liquid from about 50° C. to about 120° C.; and/or
iv. it crosslinks and develops adhesive properties at a temperature in the range about 120° C. to about 230° C.; and/or
v. it provides a shear strength in the range greater than about 10 MPa after crosslinking and cooling to ambient temperature.

Preferably the shear strength of the cured adhesive is greater than about 15 MPa more preferably greater than about 20 MPa for a non-expandable material The term flexible solid means that the composition will retain its shape within the temperature range but is sufficiently malleable that it can be shaped in place in the areas where the bond is to be formed. That a material is a flexible solid is a reflection of its viscoelastic behavior which is determined by observing the response of the material to an oscillating torque at a strain of ω Rad/s.

Preferably, the structural adhesive according to the invention is characterized by specific rheological properties at specific temperatures including viscoelastic properties. Viscoelasticity is the property of materials that exhibit both viscous and elastic characteristics when undergoing deformation. Viscous materials resist shear flow and strain linearly with time when a stress is applied. Elastic materials strain when stretched and quickly return to their original state once the stress is removed. Viscoelastic materials have elements of both of these properties and, as such, exhibit time-dependent strain. The viscosity of a viscoelastic material gives the substance a strain rate dependence on time. A viscoelastic material loses energy when a load is applied, then removed. Hysteresis is observed in the stress-strain curve, with the area of the loop being equal to the energy lost during the loading cycle. Since viscosity is the resistance to thermally activated plastic deformation, a viscous material will lose energy through a loading cycle. Plastic deformation results in lost energy, which is uncharacteristic of a purely elastic material's reaction to a loading cycle.

Viscoelasticity is studied using dynamic mechanical analysis, applying a small oscillatory stress and measuring the resulting strain. The principle of the viscosity measurement is to apply a shear force to a material in an oscillation mode or rotational mode and to record the torque resistance. This torque translates into a viscosity value (Pa·s) for a given shear rate and at a given temperature. Purely elastic materials have stress and strain in phase, so that the response of one caused by the other is immediate. In purely viscous materials, strain lags stress by a 90 degree phase lag. Viscoelastic materials exhibit behavior somewhere in the middle of these two types of material, exhibiting some lag in strain.

The complex dynamic modulus G can be used to represent the relations between the oscillating stress and strain. It has two components, the storage modulus d (elastic component) and the loss modulus $G^{II}$ (viscous component). The temperature at which the maximum for the loss modulus $G^{II}$ is observed is also used in polymer science to define the softening point (softening temperature) of the viscoleastic material and its glass transition temperature.

According to the invention, the sample is analyzed, preferably using an Anton Paar rheometer, in a shear mode at a frequency of ω Rad/s and at a heating rate of from about 50° C. to about 160° C. over a period of about 90 minutes. A skilled person knows how to measure these properties of a material including $G^I$ and $G^{II}$. Preferably, measurements are in accordance with ASTM D 4092 and ASTM D 4065. An Anton Paar rheometer device is preferably used for this viscosity measurement. A sample specimen is a disc of 24 mm diameter and 1 mm height. Viscosity measurements are made at 1 Hz frequency, with a decreasing strain from 1% to 0.1% with a temperature ramp 3° C./min between 120° C. to 40° C. Strain range has been chosen to fit inside the linear viscoelastic domain.

The viscoelastic behavior can be represented by the measure of the viscosity or the measure of the dynamic modulus. The storage modulus or elastic modulus ($G^I$) and the loss modulus or viscous modulus ($G^{II}$) are then calculated. The material is considered to be a flexible solid if $G^I$ is greater than $G^{II}$. However, to be processable, $G^I$ must not be too large and in the temperature range in which the material is processed (transformed). After crosslinking the material both $G^I$ and $G^{II}$ remain at a high level. It is preferred that prior to crosslinking the ratio $G^{II}/G^I$ is close to 1, lower than one from ambient temperature to about 50° C. and greater than 1 from about 50° C. to about 120° C.

These properties of a structural adhesive may be altered or modified in a particular direction. For example, $G^I$ and $G^{II}$ can be altered or modified by adjusting the epoxy equivalent weight (EEW) of an epoxy resin, or when the epoxy resin comprises one or more epoxy components selected from solid epoxy resins and liquid epoxy resins, by adjusting the relative content of the two epoxy components. This is subject to routine preliminary testing.

In a preferred embodiment of the invention the structural adhesive is a one component adhesive formulation that can be activated by heat and requires no further reactive components to be added to the formulation for bond formation to occur.

We have found that structural adhesive having these properties may be obtained from a formulation comprising a high molecular weight resin,
an impact modifier, and
a curing agent for the resin.

The preferred resin is a high molecular weight epoxy resin such as a bisphenol A based solid epoxy resin, EPN or ECN epoxy resin. Other resins such as thermosetting polyurethanes may be employed. The impact modifier could be a core shell polymer or a modified rubber, such as an epoxy/elastomer adduct (elastomer modified epoxy) (e.g. rubber modified epoxy, or an adduct of an epoxy resin and a solid carboxyl terminated rubber such as a solid carboxyl terminated nitrile rubber).

The dry material may be created by the use of a filler, particularly high surface area filler, the reduction or elimination of liquid ingredients and the inclusion of elastomeric and/or thermoplastic materials. The structural adhesive is crosslinkable and typically contains a curing agent for a resin component such as an epoxy resin, phenoxy resin or polyurethane resin, in particular an epoxy resin or phenoxy resin. The curing agents are usually heat activated and although they may react slowly at lower temperatures rapid activation occurs at the activation temperature. Prior to the activation temperature the structural adhesive can be softened by heat as is indicated by a reduction in $G^I$ and $G^{II}$.

However, when the activation temperature of the curing agent is reached, curing (crosslinking) of the resin will start and both $G^I$ and $G^{II}$ will increase. They will continue to increase until crosslinking is complete or the temperature is reduced and they will remain at the high level as the temperature is reduced so providing the strong bond required of a structural adhesive.

In one embodiment the material of the present invention may be an expandable material although unexpandable materials are included. Where the material is expandable, the material may expand (e.g., foam) to a volume greater than its volume in the unexpanded state (e.g., at least about 5% greater, at least about 50% greater, at least about 100% or greater, relative to the original unexpanded volume). It is also typically preferred at least for reinforcement applications that the volumetric expansion is such that the expanded volume is less than about 400%, more typically less than about 300%, even more typically less than about 200% and in certain instances less than about 100%, relative to the original unexpanded volume. The adhesives of the present invention have improved strength compared to previous foamed structural adhesives. The invention is particularly useful with low expansion foams with a degree of expansion below about 100% such as from about 40% to about 100%, particularly about 50% to about 100%, relative to the original unexpanded volume, where the increase in strength relative to previous structural foamed adhesives is greater. It is also contemplated that the volume of the material may be less after activation due to curing (e.g., crosslinking) for foamed or unfoamed versions of the structural adhesive.

The performance required of a structural adhesive is good Lap Shear, high T Peel and good performance in the Wedge Impact Test over the range of temperatures and environmental conditions to which the adhesive may be subjected. The temperature range depends upon the application to which the adhesive is put. However, in both automotive and aerospace industries the vehicles and aircraft can be subject to a wide range of temperatures. Other desirable properties include good adhesion durability under various types of exposure conditions such as high humidity, salt water and high and low temperatures with maintenance of the physical properties over time. In certain applications a high elastic modulus, a high Tg, high strain to failure and other physical properties may be desired. The structural adhesives of this invention can have an elastic modulus typically greater than about 1 GPa and a lap shear strength typically greater than about 10 MPa when tested using a 0.3 mm thickness bondline for example.

Materials that may be used in the structural adhesives of this invention are discussed below.

Modified Rubber—Epoxy/Elastomer Adduct:

The modified rubber, preferably the epoxy/elastomer adduct, may be used to impart flexibility to the structural adhesive and the ability to initiate plastic deformation. Various epoxy/elastomer adducts may be employed in the present invention. The epoxy/elastomer adduct (or hybrid) may be included in an amount of up to about 50 wt.-% of the structural adhesive. The epoxy/elastomer adduct is approximately at least about 5 wt.-%, more typically at least about 7 wt.-%, and even more typically at least about 10 wt.-% of the structural adhesive, and more preferably about 5 wt.-% to about 20 wt.-% of the epoxy/elastomer adduct based on the structural adhesive. The epoxy/elastomer adduct may be a combination of two or more particular adducts and the adducts may be solid adducts, semi-solids, at a temperature of 23° C. or may also be combinations thereof. A solid epoxy/elastomer adduct is preferred. In one preferred embodiment the epoxy/elastomer adduct is composed of substantially entirely (i.e., at least about 70 wt.-%, about 80 wt.-%, about 90 wt.-% or more) of one or more epoxy/elastomer adducts that are solid at a temperature of 23° C. We have found unexpectedly that when the epoxy/elastomer adduct is used together with a core/shell polymer and a phenoxy resin desirable adhesive performance can be achieved over a wide range of temperatures employing a relatively small amount of the epoxy/elastomer adduct. This lower amount of epoxy/elastomer adduct such as about 5 wt.-% to about 15 wt.-% imparts high temperature stability to the structural adhesive since there is little undesirable lowering of the Tg of the formulation.

The epoxy/elastomer adduct itself generally includes about 1:5 to 5:1 parts of epoxy to elastomer, and more preferably about 1:3 to 3:1 parts of epoxy to elastomer. More typically, the epoxy/elastomer adduct includes at least about 10 wt.-%, more typically at least about 20 wt.-% and even more typically at least about 40 wt.-% elastomer and also typically includes not greater than about 60 wt.-%, although higher or lower percentages are possible, relative to the total weight of the epoxy/elastomer adduct. The elastomer compound suitable for the epoxy/elastomer adduct may be a thermosetting elastomer, although not required. Exemplary elastomers include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. In one embodiment, recycled tire rubber is employed. Examples of additional or alternative epoxy/elastomer adducts suitable for use in the present invention are disclosed in United States Patent Publication 2004/0204551. Although the epoxy/elastomer adduct may contain a residual reactive epoxy functional groups, for the purpose of the specification, the epoxy/elastomer adduct is not to be regarded as an epoxy resin—these components are separate of one another.

The epoxy/elastomer adduct is included to modify structural properties of the structural adhesive such as strength, toughness, stiffness, flexural modulus, and the like. Additionally, the epoxy/elastomer adduct may be selected to render the structural adhesive more compatible with coatings such as water-borne paint or primer system or other conventional coatings.

Phenoxy Resin:

A phenoxy resin may be used as the high molecular weight resin. Phenoxy resins are high molecular weight thermoplastic condensation products of bisphenol A and epichlorohydrin and their derivatives. Typically the phenoxy resins that may be employed are of the basic formula

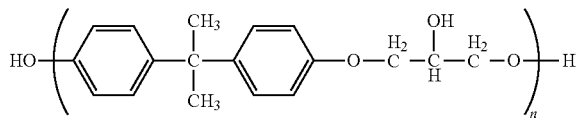

where n is typically from 30 to 100 preferably from 50 to 90. Modified phenoxy resins may also be used. Examples of phenoxy resins that may be used are the products marketed by Inchem Corp. Examples of suitable materials are the PKHB, PKHC, PKHH, PKHJ, PKHP pellets and powder. Alternatively phenoxy/polyester hybrids and epoxy/phenoxy hybrids may be used. In order to enhance the production of the structural adhesive the phenoxy resin may be supplied to the other components as a solution. While any solvent may be used it is particularly preferred to use a liquid epoxy resin as the solvent as this can also contribute to the adhesive properties upon activation. We prefer to use more than about 30 wt.-% of the phenoxy resin based on the weight of the structural adhesive. The phenoxy resin typically does not contain residual reactive epoxy functional groups. Thus, for the purpose of the specification, the phenoxy resin is not to be regarded as an epoxy resin—these components are separate of one another.

Core/Shell Impact Modifier:

A core/shell polymer may be used as the impact modifier. As used herein, the term core/shell polymer denotes a polymeric material wherein a substantial portion (e.g., greater than about 30 wt.-%, about 50 wt.-%, about 70 wt.-% or more, relative to the total weight of core/shell polymer) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or same core/shell systems. The core/shell polymer should be compatible with the other components of the formulation and preferably has a ductile core and a rigid shell which is compatible with the other components of the structural adhesive formulation.

The first and second polymeric materials of the core/shell polymer can include elastomers, polymers, thermoplastics, copolymers, other components, combinations thereof or the like. In preferred embodiments, the first polymeric material, the second polymeric material or both include or are substantially entirely composed of (e.g., at least about 70 wt.-%, about 80 wt.-%, about 90 wt.-% or more, relative to the total weight of the core/shell polymer) one or more thermoplastics. Exemplary thermoplastics include, without limitation, styrenics, acrylonitriles, acrylates, acetates, polyamides, polyethylenes or the like.

Preferred core/shell polymers are formed by emulsion polymerization followed by coagulation or spray drying. It is also preferred for the core/shell polymer to be formed of or at least include a core-shell graft co-polymer. The first or core polymeric material of the graft copolymer preferably has a glass transition temperature substantially below (i.e., at least 10, 20, 40 or more degrees centigrade) the glass transition temperature of the second or shell polymeric material. Moreover, it may be desirable for the glass transition temperature of the first or core polymeric material to be below about 23° C. while the glass temperature of the second or shell polymeric material to be above about 23° C., although not required.

Examples of useful core-shell graft copolymers are those where hard containing compounds, such as styrene, acrylonitrile or methyl methacrylate, are grafted onto a core made from polymers of soft or elastomeric compounds such as butadiene or butyl acrylate. U.S. Pat. No. 3,985,703, describes useful core-shell polymers, the cores of which are made from butyl acrylate but can be based on ethyl isobutyl, 2-ethylhexyl or other alkyl acrylates or mixtures thereof. The core polymer may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate.

The shell portion is preferably polymerized from methyl acrylates such as methyl methacrylate and optionally other alkyl acrylates and methacrylates, such as ethyl, butyl, or mixtures thereof acrylates or methacrylates as these materials are compatible with the phenoxy resin and any epoxy resins that are used in the formulation. Up to about 40 wt.-% or more of the shell monomers may be styrene, vinyl acetate, vinyl chloride, and the like. Additional core-shell graft copolymers useful in embodiments of the present invention are described in U.S. Pat. Nos. 3,984,497; 4,096,202; 4,034,013; 3,944,631; 4,306,040; 4,495,324; 4,304,709; and 4,536,436. Examples of core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

Examples of useful core/shell polymers include, but are not limited to those sold under the tradename, PARALOID, commercially available from Rohm & Haas Co. One particularly preferred grade of PARALOID impact modifier has a polymethyl methacrylate shell and an MBS core modifier and is sold under the designation EXL-2650; the product E-950 sold by Akema may also be used with equal effectiveness. We prefer to use from about 5 wt.-% to about 30 wt.-% of the core shell polymer, relative to the total weight of the structural adhesive.

Curing Agent:

One or more curing agents are included in the structural adhesive of this invention. The curing agent will cause the high molecular weight resin to crosslink/cure (set) at elevated temperature thus increasing $G^I$ and $G^{II}$. Optionally curing agent accelerators may also be included. The amounts of curing agents and curing agent accelerators used can vary widely depending upon the type of structure desired, the desired properties of the structural adhesive and in the embodiment when the material is expandable the desired amount of expansion of the structural adhesive and the desired rate of expansion. Exemplary ranges for the curing agents or curing agent accelerators present in the structural adhesive range from about 0.001 wt.-% to about 7 wt.-%, relative to the total weight of the structural adhesive.

The curing agents assist the structural adhesive in curing by crosslinking of the polymers, phenoxy resins, epoxy resins or both. It is also preferable for the curing agents to assist in thermosetting the structural adhesive. Useful classes of curing agents are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. If an accelerator for the curing agent is used examples of materials includes a modified or unmodified urea such as methylene diphenyl bis urea, an imidazole or a combination thereof.

Epoxy Resin:

The high molecular weight resin may also be or include an epoxy resin. Epoxy resin is used herein to mean any of the conventional dimeric, oligomeric or polymeric epoxy materials containing at least one epoxy functional group. Important current epoxy content is more than about 40 wt.-%. Moreover, the term epoxy resin can be used to denote one epoxy resin or a combination of multiple epoxy resins. The polymer-based materials may be epoxy-containing materials having one or more oxirane rings polymerizable by a ring opening reaction. In preferred embodiments, the structural adhesive includes between about 2 wt.-% and about 75 wt.-% epoxy resin, more preferably between about 4 wt.-% and about 60 wt.-% epoxy resin and even more preferably between about 25 wt.-% and about 50 wt.-% epoxy resin. Of course, amounts of epoxy resin may be greater or lower depending upon the intended application of the structural adhesive.

The epoxy resin may be aliphatic, cycloaliphatic, aromatic or the like. The epoxy may be supplied as a solid (e.g., as pellets, chunks, pieces or the like) or a liquid (e.g., an epoxy resin) although solid resins are preferred for the preparation of dry structural bonding materials. A liquid resin can sometimes be employed as a solvent for another component of the formulation such as a phenoxy resin (or to increase the cross-link density of the formulation). As used herein, unless otherwise stated, a resin is a solid resin if it is solid at a temperature of 23° C. and is a liquid resin if it is a liquid at 23° C. The epoxy may include an ethylene copolymer or terpolymer. As a copolymer or terpolymer, the polymer is composed of two or three different monomers, i.e., small molecules with high chemical reactivity that are capable of reacting with similar molecules.

An epoxy resin may be added to the structural adhesive to increase the adhesion, flow properties, strength or stiffness of the material. One exemplary epoxy resin may be a phenolic resin, which may be a novolak type or other type resin. Other preferred epoxy containing materials may include a bisphenol-A epichlorohydrin ether polymer, or a bisphenol-A epoxy resin which may be modified with butadiene or another polymeric additive or bisphenol-F-type epoxy resins. Moreover, various mixtures of several different epoxy resins may be employed as well. Examples of suitable epoxy resins are sold under the tradename Araldite GY 282, GY 281 and GY 285 supplied by Huntsman.

Other Ingredients:

The compositions of this invention may contain other ingredients such as one or more of the following
i) polymers or copolymers;
ii) blowing agent;
iii) filler;
iv) flow control materials;
v) nano particles;
vi) pigments;
vii) flame retardants;
viii) fibres; and/or
ix) moisture scavengers.

Polymer or Copolymer:

Depending upon the use to which the structural adhesive is to be put, it may include one or more additional polymers or copolymers which may or may not contain functional groups, which can include a variety of different polymers, such as thermoplastics, elastomers, plastomers and combinations thereof or the like. For example, and without limitation, polymers that might be appropriately incorporated into the structural adhesive include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terephthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyimide, polyimide, polyisobutylene, polyacrylonitrile, poly(vinyl chloride), poly(methyl methacrylate), poly(vinyl acetate), poly (vinylidene chloride), polytetrafluoroethylene, polyisoprene, polyacrylamide, polyacrylic acid, polymethacrylate.

When used, these polymers can comprise a small portion or a more substantial portion of the material. When used, the one or more additional polymers preferably comprises about 0.1 wt.-% to about 50 wt.-%, more preferably about 1 wt.-% to about 20 wt.-%, and even more preferably about 2 wt.-% to about 10 wt.-% of the structural adhesive.

In certain embodiments, it may be desirable to include one or more thermoplastic polyethers and/or thermoplastic epoxy resins in the structural adhesive. When included, the one or more thermoplastic polyethers preferably comprise between about 1 wt.-% and about 90 wt.-% of the structural adhesive, more preferably between about 3 wt.-% and about 60 wt.-% of the structural adhesive and even more preferably between about 4 wt.-% and about 25 wt.-% of the structural adhesive. As with the other materials, however, more or less thermoplastic polyether may be employed depending upon the intended use of the structural adhesive.

The thermoplastic polyethers typically include pendant hydroxyl moieties. The thermoplastic polyethers may also include aromatic ether/amine repeating units in their backbones. The thermoplastic polyethers preferably have a melt index between about 5 and about 100, more preferably between about 25 and about 75 and even more preferably between about 40 and about 60 grams per 10 minutes for samples weighing 2.16 kg at a temperature of about 190° C. Of course, the thermoplastic polyethers may have higher or lower melt indices depending upon their intended application. Preferred thermoplastic polyethers include, without limitation, polyetheramines, poly(amino ethers), copolymers of monoethanolamine and diglycidyl ether, combinations thereof or the like.

Preferably, the thermoplastic polyethers are formed by reacting an amine with an average functionality of 2 or less (e.g., a difunctional amine) with a glycidyl ether (e.g., a diglycidyl ether). As used herein, the term difunctional amine refers to an amine with an average of two reactive groups (e.g., reactive hydrogens).

According to one embodiment, the thermoplastic polyether is formed by reacting a primary amine, a bis (secondary) diamine, a cyclic diamine, a combination thereof or the like (e.g., monoethanolamine) with a diglycidyl ether or by reacting an amine with an epoxy-functionalized poly(alkylene oxide) to form a poly(amino ether). According to another embodiment, the thermoplastic polyether is prepared by reacting a difunctional amine with a diglycidyl ether or diepoxy-functionalized poly(alkylene oxide) under conditions sufficient to cause the amine moieties to react with the epoxy moieties to form a polymer backbone having amine linkages, ether linkages and pendant hydroxyl moieties. Optionally, the polymer may be treated with a monofunctional nucleophile which may or may not be a primary or secondary amine.

Additionally, it is contemplated that amines (e.g., cyclic amines) with one reactive group (e.g., one reactive hydrogen) may be employed for forming the thermoplastic polyether. Advantageously, such amines may assist in controlling the molecular weight of the thermoplastic ether formed.

Examples of preferred thermoplastic polyethers and their methods of formation are disclosed in U.S. Pat. Nos. 5,275,853; 5,464,924 and 5,962,093. Advantageously, the thermoplastic polyethers can provide the structural adhesive with various desirable characteristics such as desirable physical and chemical properties for a wide variety of applications as is further described herein.

Although not required, the formulation may include one or more ethylene polymers or copolymers such as ethylene acrylate copolymers, ethylene vinyl acetate copolymers. Ethylene methacrylate and ethylene vinyl acetate are two preferred ethylene copolymers.

It may also be desirable to include a reactive polyethylene resin that is modified with one or more reactive groups such as glycidyl methacrylate or maleic anhydride. Examples of such polyethylene resins are sold under the tradename LOTADER® (e.g., LOTADER AX 8900) and are commercially available from Arkema Group.

Blowing Agent:

The invention envisages both non-expandable and expandable structural adhesives although non-expandable materials are more typical. If the structural adhesive is expandable one or more blowing agents may be added for producing inert gasses that form, as desired, an open and/or closed cellular structure within the structural adhesive. In this manner, it may be possible to lower the density of articles fabricated by using the structural adhesive. In addition, the material expansion can help to improve sealing capability, acoustic damping and particularly adhesion to bonding substrate.

The blowing agent may include one or more nitrogen containing groups such as amides, amines and the like. Examples of suitable blowing agents include azodicarbonamide, dinitrosopentamethylenetetramine, azodicarbonamide, dinitrosopentamethylenetetramine, 4,4'-oxy-bis-(benzene-sulphonylhydrazide), trihydrazinotriazine and N,N'-dimethyl-N,N'-dinitrosoterephthalamide. An accelerator for the blowing agents may also be provided. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles (ureas).

Another class of blowing agents are physical blowing agents such as Expancel products marketed by Akzo-Nobel. These blowing agents consist of a polymeric particle with a volatile liquid in the center. As the temperature is increased, the polymer shell softens and the gas inside the particle causes the polymer particle to expand. In this way, a foamed product is produced.

The amounts of blowing agents and blowing agent accelerators that are used can vary widely depending upon the type of cellular structure desired, the desired amount of expansion of the structural adhesive, the desired rate of expansion and the like. Exemplary ranges for the amounts of blowing agents and blowing agent accelerators in the structural adhesive range from about 0.001 wt.-% to about 5 wt.-%, relative to the total weight of the structural adhesive, and are preferably in the structural adhesive in fractions of weight percentages.

Filler:

The structural adhesive may also include one or more fillers, including but not limited to particulate materials (e.g., powder), beads, microspheres such as Zeospheres available from Zeelan Industries, or the like. Preferably the filler includes a material that is generally non-reactive with the other components present in the structural adhesive. However, the surfaces may be treated to improve adhesion or compatibility with the adhesive matrix. While the fillers may generally be present within the structural adhesive to take up space at a relatively low weight and cost, it is contemplated that the fillers may also impart properties such as strength and impact resistance to the structural adhesive.

Examples of fillers that may be used include silica, diatomaceous earth, glass, clay (e.g., including nanoclay), talc, pigments, colorants, glass beads or bubbles, glass, carbon or ceramic fibers, nylon or polyamide fibers (e.g., Kevlar), antioxidants, and the like. Such fillers, particularly clays, can assist the structural adhesive in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers.

When employed, the fillers in the structural adhesive can range from about 10 wt.-% or less to about 70 wt.-% or greater of the structural adhesive. According to some embodiments, the structural adhesive may include from about 0 wt.-% to about 3 wt.-%, and more preferably slightly less than about 1 wt.-% clays or similar fillers, relative to the total weight of the structural adhesive. Powdered (e.g. about 0.01 to about 50 micron mean particle diameter, and more preferably about 1 to 25 micron mean particle diameter) mineral type filler can comprise between about 5 wt.-% and 70 wt.-%, more preferably about 10 wt.-% to about 50 wt.-%, relative to the total weight of the structural adhesive.

Other Components and Additives:

It is contemplated that most nearly any additional chemicals, materials or otherwise may be added to the structural adhesive assuming they are suitable for the chosen application of the structural adhesive.

Other additives, agents or performance modifiers may also be included as desired, including but not limited to an antioxidant, a UV resistant agent, a flame retardant a heat stabilizer, a colorant, a processing aid, a lubricant, a reinforcement (e.g., chopped or continuous glass, ceramic, aramid, or carbon fiber, particulates or the like). Liquid polysulfides particularly epoxidized may be used to improve the environmental exposure of the adhesive such as exposure to humidity and salt water.

When determining appropriate components for the structural adhesive, it may be important to form the material such that it will only activate (e.g., flow, foam or otherwise change states) at appropriate times or temperatures. For instance, it is undesirable for the material to be reactive at ambient temperature in a(n) assembly environment. More typically, the structural adhesive becomes activated at higher processing temperatures. As an example, temperatures such as those encountered in an automobile assembly plant may be appropriate, especially when the structural adhesive is processed along with the other components at elevated temperatures or at higher applied energy levels, e.g., during painting preparation steps. Temperatures encountered in many coating operations (e.g., in a paint and/or e-coat curing oven), for instance, range up to about 250° C. or higher.

The relative proportions of the materials that should be used will depend upon the use envisaged for the structural adhesive. We prefer however to use from about 40 wt.-% to about 75 wt.-% of the high molecular weight resin, from about 10 wt.-% to about 25 wt.-% of an impact modifier and from about 0.5 to about 10 wt.-% of the curing agent. Preferred amounts of the other optional ingredients are as follows: about 5 wt.-% to about 75 wt.-% of one or more epoxy resins, preferably a liquid epoxy resin, about 0.2 wt.-% to about 3 wt.-% of a cure accelerator, about 0.1 wt.-% to about 50 wt.-% mineral filler, about 0.1 wt.-% to about 3.0 wt.-% clay and/or silica.

Formation, Processing, Storage and Application of the Structural Adhesive:

Formation of the structural adhesive can be accomplished according to a variety of new or known techniques. According to one embodiment, the structural adhesive may be formed by supplying a resin such as a high molecular weight resin and the impact modifier in solid form such as pellets, chunks and the like and melt blending with the curing agent at a temperature below that at which the curing agent is activated. Alternatively, if a phenoxy resin is used a solution of the phenoxy resin in a liquid epoxy resin may be used and blended with a core/shell polymer, the fillers may then be added and finally the curing agent and optionally any curing agent accelerator are added and mixed, preferably under vacuum to remove any entrapped air. The components are typically combined in one or more blenders such as large bins or other containers. Preferably, the containers can be used to intermix the components by rotating or otherwise moving the container. Thereafter, heat, pressure or a combination thereof may be applied to soften or liquidize the solid components such that the components can be intermixed by stirring or otherwise into a single homogenous composition. The heat and pressure may then be relaxed to yield the dry structural adhesive of the invention as a flexible solid as herein described. This may then be pelletized and these pellets can be processed further for example by injection molding or blow molding to form a molded structural adhesive material, alternatively the pellets may be extruded to form a flexible strip or tape of the structural adhesive.

It is important to ensure that the temperature of the components remains below the curing temperature of the adhesive during blending and processing once the curing agents have been added so that $G^I$ and $G^{II}$ remain low and significant pre-reaction is avoided. Additionally, when the structural adhesive contains a blowing agent, it is desirable to maintain the temperature of the structural adhesive below a temperature that will activate the blowing agent during formation and processing of the structural adhesive.

In use the structural adhesive of the present invention is typically molded at a temperature below the curing (crosslinking) temperature to produce a flexible molding of the required shape which may be a preformed component or a tape or strip. The adhesive may then be laid up with the components that are to be bonded together and activated to cure/crosslink the structural adhesive. Activation may be accomplished in a paint oven. In this instance the adhesive is formulated to be activated at the desired temperature which is in the range about 120° C. to about 230° C. In automobile manufacture where activation typically occurs at elevated temperatures in the range about 140° C. to about 200° C. the time required for curing/crosslinking of the adhesive depends upon the requirements of the assembly line and the temperature employed therein with about 30 minutes being typical. Activation of the material may also include at least some degree of foaming or bubbling in situations where the structural adhesive includes a blowing agent. Such foaming or bubbling can assist the structural adhesive in wetting a substrate and forming an intimate bond with the substrate. In a further embodiment the structural adhesive may be extruded in place at the location where it is to be activated to form the bond, although the adhesive is particularly suitable for molding into any required shape and pre-assembled with the materials to be bonded together and the adhesive activated by heating to the curing temperature for the required time so that it bonds the materials together. The adhesive crosslinks during activation to increase $G^I$ and $G^{II}$ which will remain at the higher level when the temperature is subsequently reduced.

The adhesive of the present invention may be applied in any suitable form. For example it may be extruded into tapes, strips or films, it may be extruded and pelletized, it may be blow molded, injection molded thermoformed or heat pressed to the final shape of adhesive required. It is particularly useful that the adhesive can be shaped at temperatures below that at which significant thermosetting occurs and at which it is flexible (up to about 120° C.) and may then be cooled to form an integral structure such as molded part, a tape or strip which can be wound into a reel for storage and supply. Alternatively the adhesive may be applied to a carrier or to the surface of one of the components that are to be bonded together and transported to where it may be assembled with other components and heated to create the bond between the carrier or component and the other component.

The carrier or component provided with the adhesive may be produced in one location and transported to another location where the bond is created. The adhesive may be supplied to the surface or surfaces to be bonded in a malleable form that allows it to be conformed to the surface or surfaces. The surfaces to be bonded may then be brought together with the adhesive therebetween and bonded together by heating the adhesive to a temperature in the range at which it will crosslink (about 120° C. to about 230° C.). The structure may then be allowed to cool to provide a strong bond between the two surfaces.

We have found that the structural adhesive whether in pellets, premolded components, tapes or strips or deposited on a carrier or the surface of a component can be stored and transported at temperatures in the range about 10° C. to about 80 C.° (e.g., about 50° C.) without any undesirable pre-reaction and without the onset of significant crosslinking. Storage for 21 days without significant crosslinking is considered to show storage stability.

In another embodiment the adhesive may be extruded onto one of the surfaces of an article at a temperature in the range at which it remains flexible and then allowed to cool to provide the desired pattern of a dry to the touch heat activatable adhesive on the surface. The article may then be brought into contact with the surface of another article so that the adhesive contacts the other surface and heated to a temperature in the crosslinking reaction to produce the bond between the surfaces. This process is described in European patent Publication 1 331 080.

In one preferred embodiment the adhesive is in the form of a tape, strip or film produced by extrusion. The preferred dimensions of the tape, strip or film will depend upon the use to which it is to be put however tapes for structural bonding in the automobile and aerospace industries typically have a thickness of from about 0.3 to about 15 mm and a width of from about 10 to about 100 mm.

In a further embodiment the adhesive may be supplied with a backing material which can be removed once the adhesive is located where the bond is to be formed.

Depending upon the intended application, the structural adhesive may be applied and activated in different ways and at different times. The material may be formed into a strip and applied by hand or mechanically to wherever it is to be used. The material may be extruded onto the position where it is used. Thus, exemplary uses of the structural adhesive are discussed below to illustrate preferred methodologies of application and activation of the structural adhesive. In particular, the structural adhesive may be used for, amongst others, reinforcement, sealing and adhering or the like.

Reinforcement:

The structural adhesive may be used to reinforce structural members of an article of manufacture. When used for reinforcement, the structural adhesive may be employed by itself, it may be employed in conjunction with other materials (e.g., a backing), or it may be applied to a carrier member or the like. The structural adhesive is particularly useful to provide added strength to metal welds such as weld flanges and may be applied between pieces of metal that are subsequently welded together. In a further preferred use the material is used to bond metal components together replacing the need for welds.

According to one embodiment, the structural adhesive of the present invention is applied to a carrier member to form a reinforcement member and the reinforcement member is inserted within a cavity formed by a structural member of an automotive vehicle. The structural member of the automotive vehicle may be any member of the vehicle including, but not limited to, frame members, rails, body members, pillar structures, closure panels, roof assemblies, bumpers, combinations thereof or the like.

The carrier member may be selected from a variety of conventional and novel configurations. The structural adhesive of the present invention may thus be applied to a carrier member, such as a molded, extruded or stamped member (e.g., metal or plastic, foamed or unfoamed; exemplary materials of which include aluminum, magnesium, titanium, steel, molding compound (e.g., sheet or bulk molding compound), polyamide (e.g., nylon 6 or nylon 6,6), polysulfone, thermoplastic imide, polyether imide, polyether sulfone or mixtures thereof. The adhesive may be applied at a temperature below the onset of crosslinking so it adheres to the carrier and cools to provide a non-tacky to the touch material ready for subsequent activation and crosslinking.

The materials of the present invention have been found to be effective structural adhesives which have desirable performance over an extended temperature range particularly in the Wedge Impact Test. The materials have been found to maintain their adhesive properties over an extended period of time and to be effective in humid or salt spray environments. They are useful for structural bonding in a variety of applications such as in the automotive, aircraft, aerospace, railroad vehicles, trucks, busses, sports goods, construction and furniture industries. They have been found to be particularly useful in reinforcing welded areas and in some instances to avoid the need to weld in areas that have hitherto been welded.

Another aspect of the invention relates to a method for providing corrosion resistance to a substrate comprising applying an adhesive as defined above in connection with the use according to the invention to a substrate as a continuous band or strip and locating the adhesive on the adhesive carrying substrate adjacent to a second substrate and activating the adhesive to bond the two substrates together.

All preferred embodiments that have been described above in relation to the use according to the invention also analogously apply to the method according to the invention.

Preferably, the method according to the invention is for forming bonds on a substrate that are not susceptible to cause corrosion on the substrate along the length of the bond.

In a preferred embodiment of the method according to the invention, a continuous band or strip of the adhesive is applied to the substrate.

Preferably, the substrate comprises a metal or an alloy that is susceptible to corrosion.

Preferably, the invention provides a method for forming bonds which are not susceptible to corrosion comprising applying a structural adhesive to a substrate as a continuous band or strip and locating the adhesive on the adhesive carrying substrate adjacent to a second substrate and activating the adhesive to bond the two substrates together wherein the adhesive is i) heat activated at a temperature in the range about 130° C. to about 230° C.,
ii) reformable in the temperature range about 60° C. to about 120° C. and is curable in the temperature range about 130° C. to about 230° C.; and has
   a) a storage modulus $G^I$ higher than its loss modulus $G^{II}$ for temperatures up to about 50° C.;
   b) a loss modulus $G^{II}$ higher than its storage modulus $G^I$ in the temperature range about 60° C. to about 120° C.; and
   c) starts to cure at about 130° C., leading to a thermoset structural adhesive.

The following examples further illustrate the invention but are not to be construed as limiting its scope.

Example 1

A structural adhesive formulation containing curable polymers and a curing agent that starts to cure at about 125° C. was prepared and its storage modulus $G^I$ and loss modulus $G^{II}$ was determined over the temperature range of about 30° C. to about 110° C. as is shown in FIG. 1.

Figure 2:
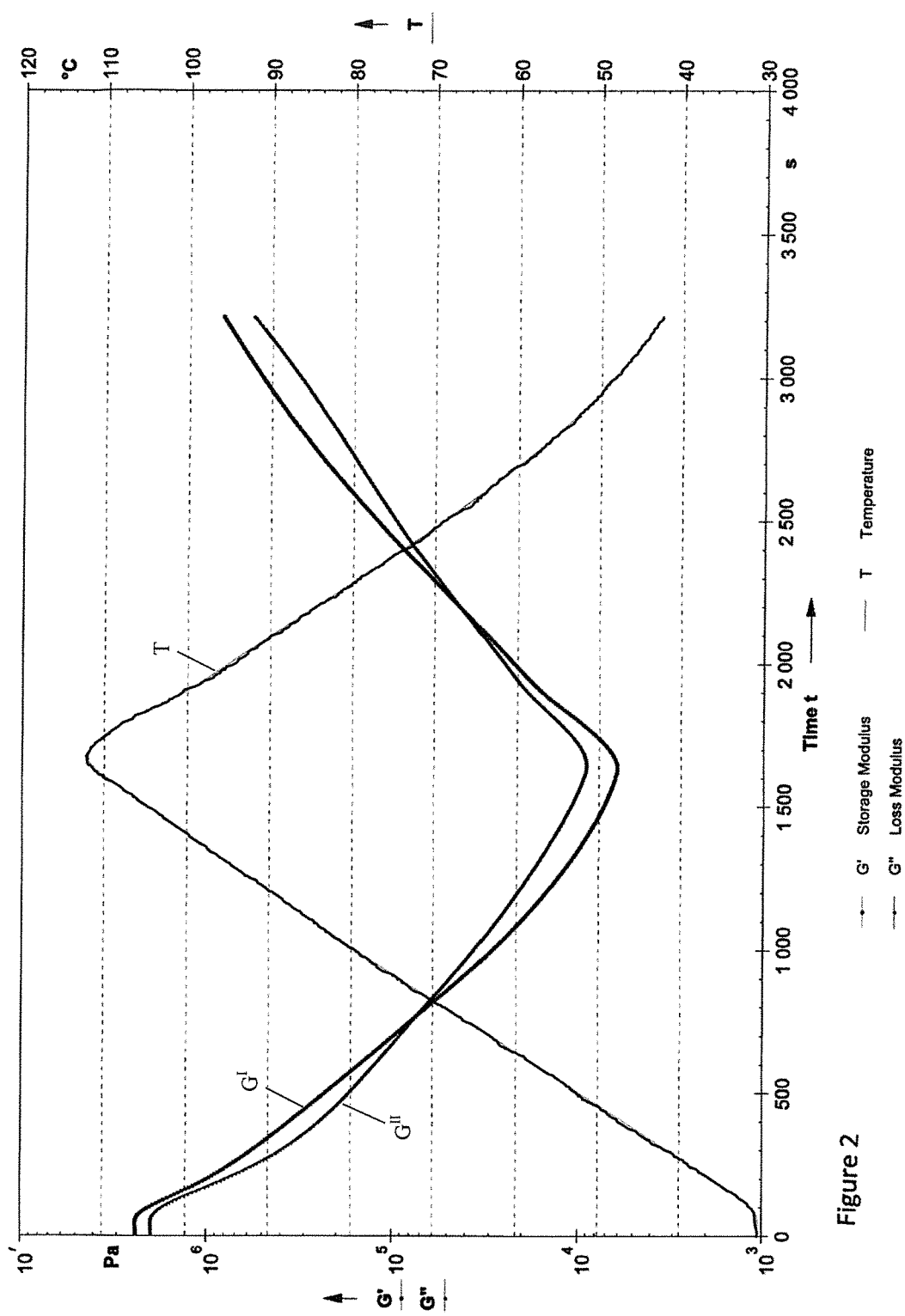
FIG. 2 illustrates a graph of the storage modulus and loss modulus over a range of temperatures for an example material consistent with the teachings herewith.

The storage modulus $G^I$ and the loss modulus $G^{II}$ was also determined over a time period of 3500 seconds during the heating of the adhesive from about 30° C. to about 110° C. and then looking down to about 40° C. The change in the storage modulus $G^I$ and loss modulus $G^{II}$ is shown in FIG. 2 indicating that at about 70° C. the product changes from a solid state to a viscous liquid and that up to the temperature of about 11° C. this is reversible.

It was found that the adhesive could be applied to a metal surface at a temperature of about 10° C. to provide a continuous strip of adhesive which could be cured to obtain a well-defined structural bond which appeared to provide long term corrosion resistance to the control area of the metal surface.

Example 2

In accordance with Example 1, a structural adhesive formulation containing curable polymers and a curing agent that starts to cure at about 125° C. was prepared from the following constituents in the following amounts:

| Constituent | wt.-% |
| --- | --- |
| CTBN modified epoxy resin (1600 g/Eq) | 6.00 |
| Solid epoxy resin (900 g/Eq) Molecular Weight > 1100 g/mol | 5.00 |
| Micronized grade of dicyandiamide (<50 μm) | 5.00 |
| Aromatic substituted urea (Methylene Diphenyl Bis (Dimethyl Urea)) (latent accelerator for the dicyandiamide cure of epoxy resins) | 0.60 |
| Calcium oxide (<70 μm) | 5.00 |
| Calcium carbonate (<70 μm) | 18.40 |
| Silane modified epoxy resin (200 g/Eq) | 16.00 |
| Methacrylate-butadiene-styrene (MBS) core/shell impact modifier: cross-linked poly (butadiene/styrene) core with a grafted polymethyl methacrylate shell | 16.00 |
| Epoxy Phenol Novolac Resin | 8.00 |
| Phenoxy Resin | 15.00 |
| Amorphous Silica (<50 nanometers: 40%) reinforced bisphenol F based epoxy resin | 5.00 |

Figure 3:
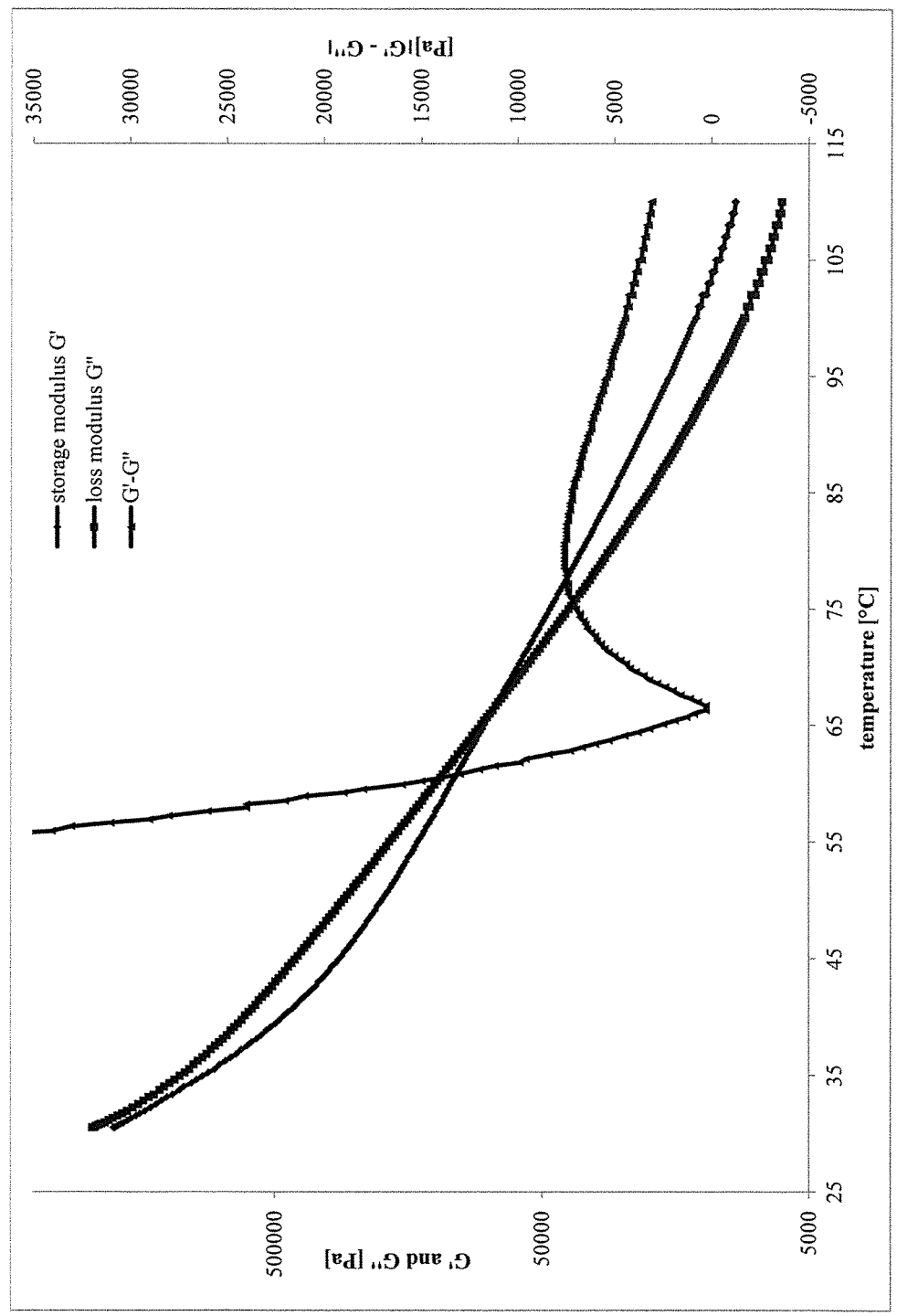
FIG. 3 illustrates a graph of the storage modulus and loss modulus over a range of temperatures for an example material consistent with the teachings herewith.

The storage modulus $G^I$ and loss modulus $G^{II}$ was determined over the temperature range of about 30° C. to about 110° C. as is shown in FIG. 3. The absolute value for the difference of G' and G' is also shown (y-axis to the right). The crossover temperature was observed at about 66.5° C.

Example 3

In accordance with Example 1 and 2, a structural adhesive formulation containing curable polymers and a curing agent that starts to cure at about 125° C. was prepared from the following constituents in the following amounts:

| Constituent | wt.-% |
| --- | --- |
| Solid epoxy resin type I (EEW 450-530 g/eq) | 4.00 |
| Liquid epoxy resin (EEW 200 g/eq) | 22.00 |
| MBS based core shell impact modifier | 13.40 |
| Polyvinylbutyral | 4.85 |
| Phenoxy resin derived from Bisphenol A | 16.95 |
| Epoxy terminated CTBN adduct | 20.00 |
| Micronized Polyamide 6/12 (particle size 20 μm) | 8.00 |
| Talc | 1.01 |
| Calcium oxide | 5.00 |
| Thixotropic agent (Organo clay) | 0.76 |
| Pigment | 0.05 |
| Disubstituted urea | 0.35 |
| Dicyandiamide | 3.00 |
| Chemical blowing agent ADCA | 0.63 |
| TOTAL | 100.00 |

Figure 4:
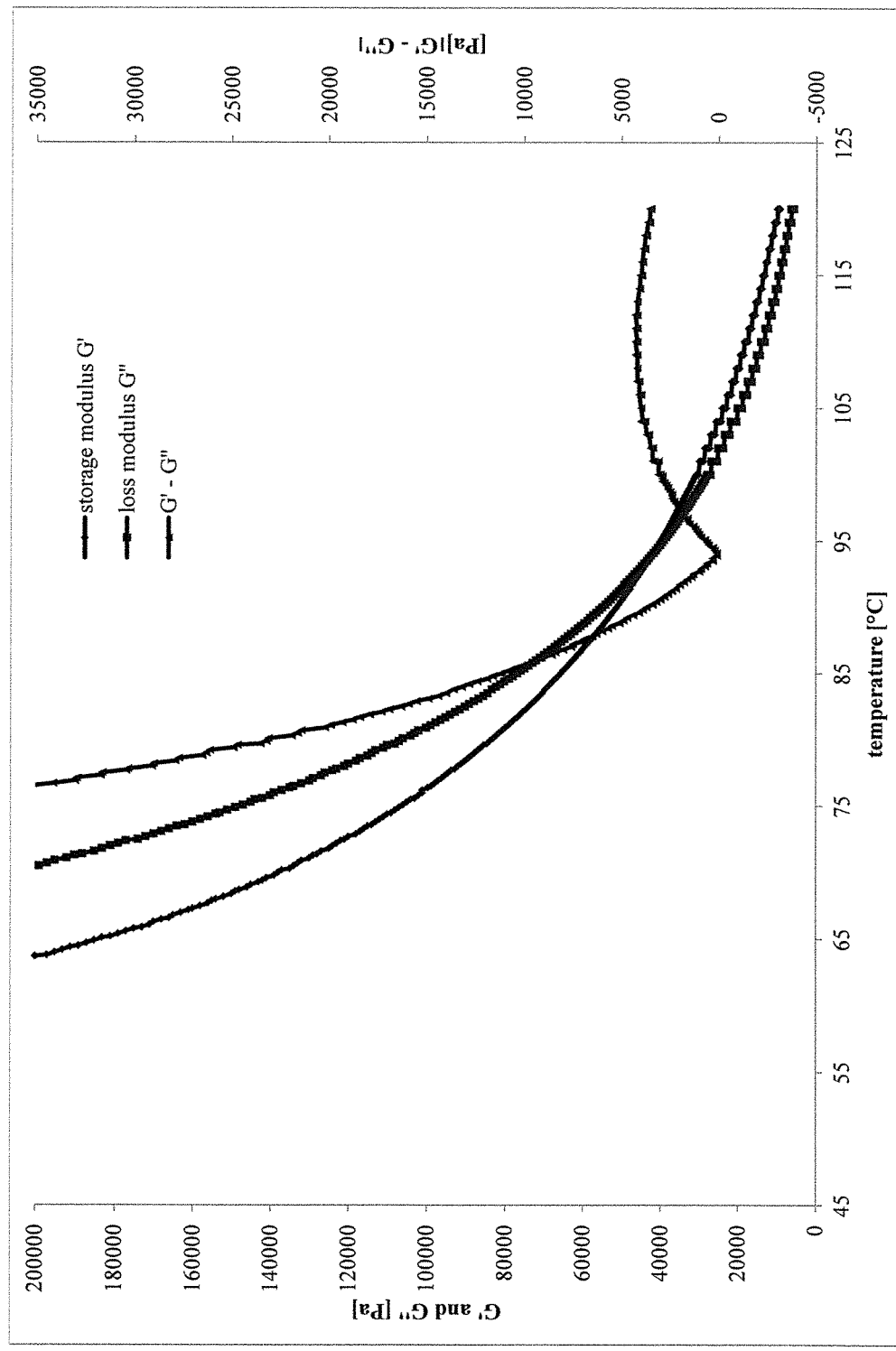
FIG. 4 illustrates a graph of the storage modulus and loss modulus over a range of temperatures for an example material consistent with the teachings herewith.

The storage modulus $G^I$ and loss modulus $G^{II}$ was determined over the temperature range of about 30° C. to about 120° C. as is shown in FIG. 4. The absolute value for the difference of G' and G' is also shown (y-axis to the right). The crossover temperature was observed at about 94° C.

The invention claimed is:

1. An adhesive for providing corrosion resistance to a substrate to which the adhesive is adhered, the adhesive comprising:
   a) from about 25% to about 50%, by weight of the adhesive, epoxy resin with about 25% to about 75%, by weight of the epoxy resin, being high molecular weight resin, the high molecular weight resin including a phenoxy resin;
   b) from about 10% to about 25%, by weight of the adhesive, core/shell impact modifier; and
   c) from about 0.5% to about 10%, by weight of the adhesive, curing agent;
   wherein the adhesive is reformable from about 60° C. to about 120° C., and wherein the adhesive is curable from about 125° C. to about 230° C.;
   wherein a temperature range in which $G^I>G^{II}$ is from about 10° C. to about 50° C.;
   wherein a temperature range in which $G^{II}>G^I$ is from about 80° C. to about 120° C.;
   wherein the adhesive is free from crosslinking below 125° C.;
   wherein the epoxy resin comprises a solid epoxy resin and a liquid epoxy resin; and
   wherein a ratio of the solid epoxy resin to the epoxy resin is from about 1:9 to about 1:16, by weight.

2. The adhesive according to claim 1, wherein the temperature range in which $G^I>G^{II}$ is from about 10° C. to about 45° C.

3. The adhesive according to claim 2, wherein the temperature range in which $G^I>G^{II}$ is from about 10° C. to about 40° C.

4. The adhesive according to claim 3, wherein the temperature range in which $G^I>G^{II}$ is from about 10° C. to about 30° C.

5. The adhesive according to claim 4, wherein the temperature range in which $G^{II}>G^I$ is from about 110° C. to about 120° C.; and wherein $G^I$ is equal to $G^{II}$ at a crossover temperature which is within the temperature range of from about 30° C. to about 110° C.

6. The adhesive according to claim 1, wherein the relative difference, $G^I$-$G^{II}$, is at least about 10,000 Pa in the temperature range in which $G^I$>$G^{II}$.

7. The adhesive according to claim 6, wherein the relative difference, $G^I$-$G^{II}$, is at least about 30,000 Pa in the temperature range in which $G^I$>$G^{II}$.

8. The adhesive according to claim 7, wherein the temperature range in which $G^{II}$>$G^I$ is from about 85° C. to about 120° C.

9. The adhesive according to claim 8, wherein the temperature range in which $G^{II}$>$G^I$ is from about 90° C. to about 120° C.

10. The adhesive according to claim 9, wherein the temperature range in which $G^{II}$>$G^I$ is from about 95° C. to about 120° C.

11. The adhesive according to claim 10, wherein the temperature range in which $G^{II}$>$G^I$ is from about 100° C. to about 120° C.

12. The adhesive according to claim 1, wherein the relative difference, $G^{II}$-$G^I$, is at least about 3,000 Pa in the temperature range in which $G^{II}$>$G^I$.

13. The adhesive according to claim 12, wherein the relative difference, $G^{II}$-$G^I$, is at least about 6,000 Pa in the temperature range in which $G^{II}$>$G^I$.

14. The adhesive according to claim 1, wherein the adhesive forms bonds on the substrate that are not susceptible to cause corrosion on the substrate along the length of the bonds,
wherein the adhesive is heat activated at a temperature from about 130° C. to about 230° C.; and starts to cure at about 130° C., leading to a thermoset structural adhesive.

15. The adhesive according to claim 1, wherein the adhesive provides a shear strength greater than about 10 Mpa, greater than about 15 Mpa, or even greater than about 20 Mpa after crosslinking and cooling to ambient temperature.

16. The adhesive according to claim 1, wherein the adhesive comprises:
from about 5% to about 50%, by weight of the adhesive, an epoxy/elastomer adduct.

17. The adhesive according to claim 16, wherein the adhesive comprises from about 6% to about 20%, by weight of the adhesive, the epoxy/elastomer adduct.

18. The adhesive according to claim 17, wherein the adhesive comprises from about 26% to about 34%, by weight of the adhesive, the epoxy resin.

19. The adhesive according to claim 18, wherein the adhesive further comprises from about 0.001% to about 5%, by weight of the adhesive, blowing agent; and wherein the adhesive expands after activation to a volume about 5% or more to about 400% or less relative to the original unexpanded volume.

* * * * *